US009818057B2

(12) United States Patent
Nishitani et al.

(10) Patent No.: US 9,818,057 B2
(45) Date of Patent: *Nov. 14, 2017

(54) NEURAL NETWORK CIRCUIT AND LEARNING METHOD THEREOF

(71) Applicant: PANASONIC INTELLECTUAL PROPERTY MANAGEMENT CO., LTD., Osaka (JP)

(72) Inventors: Yu Nishitani, Kyoto (JP); Yukihiro Kaneko, Osaka (JP); Michihito Ueda, Kyoto (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 369 days.

This patent is subject to a terminal disclaimer.

(21) Appl. No.: 14/611,145

(22) Filed: Jan. 30, 2015

(65) Prior Publication Data
US 2015/0178619 A1    Jun. 25, 2015

Related U.S. Application Data

(63) Continuation of application No. PCT/JP2014/002570, filed on May 15, 2014.

(30) Foreign Application Priority Data

Jul. 4, 2013  (JP) ................. 2013-140389

(51) Int. Cl.
*G06N 3/04* (2006.01)
*G06N 3/08* (2006.01)
*G06N 3/063* (2006.01)

(52) U.S. Cl.
CPC ............... *G06N 3/04* (2013.01); *G06N 3/049* (2013.01); *G06N 3/063* (2013.01); *G06N 3/08* (2013.01)

(58) Field of Classification Search
CPC .......... G06N 3/04; G06N 3/049; G06N 3/063; G06N 3/08
(Continued)

(56) References Cited

U.S. PATENT DOCUMENTS 5,004,932 A * 4/1991 Nejime ................ G06N 3/0635
326/36
5,450,528 A   9/1995 Chung et al.
(Continued)

FOREIGN PATENT DOCUMENTS

JP      07-114524 A    5/1995
JP      H07-114524 A   5/1995
(Continued)

OTHER PUBLICATIONS

Nishitani Y. et al., "Ferroelectric synapse device with brain-like learning function: Analog conductance control in a ferroelectric-gate field-effect transistor based on the timing difference between two pulses", Extended Abstracts of the 2012 International Conference on Solid State Devices and Materials, Kyoto, 2012, pp. 1140-1141.*

(Continued)

*Primary Examiner* — Dave Misir
(74) *Attorney, Agent, or Firm* — McDermott Will & Emery LLP

(57) ABSTRACT

In a neural network circuit element, a neuron circuit includes a waveform generating circuit for generating an analog pulse voltage, and a switching pulse voltage which is input as a first input signal to another neural network circuit element; a synapse circuit is configured such that the analog pulse voltage generated in the neuron circuit of the neural network circuit element including the synapse circuit is input to a third terminal of a variable resistance element of the synapse circuit, for a permissible input period, in the first input signal (Continued)

from another neural network circuit element; and the synapse circuit is configured such that the resistance value of the variable resistance element is changed in response to an electric potential difference between a first terminal and the third terminal, which occurs depending on a magnitude of the analog pulse voltage for the permissible input period.

8 Claims, 26 Drawing Sheets

(58) Field of Classification Search
USPC .................................................. 706/25–26
See application file for complete search history.

(56) References Cited

U.S. PATENT DOCUMENTS

| | | | |
|---|---|---|---|
| 5,519,812 A * | 5/1996 | Ishihara | G06N 3/0635 257/295 |
| 5,630,023 A | 5/1997 | Oteki | |
| 5,633,989 A * | 5/1997 | Shin | G06N 3/0635 706/35 |
| 6,470,328 B1 | 10/2002 | Varshaysky | |
| 6,847,071 B2 | 1/2005 | Ueda et al. | |
| 8,441,835 B2 | 5/2013 | Jo et al. | |
| 8,614,432 B2 | 12/2013 | Pickett et al. | |
| 8,658,476 B1 | 2/2014 | Sun et al. | |
| 8,775,346 B2 | 7/2014 | Nishitani et al. | |
| 2004/0084727 A1 * | 5/2004 | Ueda | G06N 3/0635 257/347 |
| 2006/0294034 A1 | 12/2006 | Fuji | |
| 2007/0011120 A1 * | 1/2007 | Matsugu | G06K 9/00973 706/16 |
| 2008/0162391 A1 | 7/2008 | Lzhikevich | |
| 2008/0275832 A1 | 11/2008 | McDaid et al. | |
| 2009/0014708 A1 | 1/2009 | Sasago et al. | |
| 2009/0043722 A1 | 2/2009 | Nugent | |
| 2009/0097299 A1 | 4/2009 | Tanaka et al. | |
| 2012/0008365 A1 | 1/2012 | Kaneko | |
| 2012/0217997 A1 | 8/2012 | Kaneko | |
| 2013/0087755 A1 | 4/2013 | Prodromakis et al. | |
| 2013/0094274 A1 | 4/2013 | Kaneko | |
| 2013/0311414 A1 | 11/2013 | Nishitani et al. | |
| 2013/0311415 A1 | 11/2013 | Nishitani et al. | |
| 2014/0112051 A1 | 4/2014 | Kaneko | |

FOREIGN PATENT DOCUMENTS

| | | |
|---|---|---|
| JP | 2009-282782 A | 12/2009 |
| JP | 2010-146514 A | 7/2010 |

OTHER PUBLICATIONS

Yu Nishitani et al., "Dynamic Observation of Brain-Like Learning in a Ferroelectric Synapse Device", Japanese Journal of Applied Physics, vol. 52, No. 4S, (2013), pp. 04CE06-1-04CE0-6.
International Search Report issued in International Application No. PCT/JP2014/002570 with Date of mailing Aug. 19, 2014, with English Translation.
Y. Nishitani et al, "Ferroelectric synapse device with brain-like learning function: Analog conductance control in a ferroelectric-gate field-effect transistor based on the timing difference between two pulses", Extended Abstracts of the 2012 International Conference on Solid State Devices and Materials, J-4-3, pp. 1140-1141, 2012.
U.S. Notice of Allowance dated Nov. 21, 2014 issued in U.S. Appl. No. 13/951,448.
U.S. Office Action dated Aug. 7, 2014 issued in U.S. Appl. No. 13/951,448.
International Search Report issued in International Patent Application No. PCT/JP2012/003492 dated Aug. 7, 2012.
Wolfgang Maass, "Networks of Spiking Neurons: The Third Generation of Neural Network Models," Neural Networks, vol. 19, No. 9, pp. 1659-1671, 1997.
U.S. Notice of Allowance dated Apr. 14, 2014 issued in U.S. Appl. No. 13/951,443.
U.S. Office Action dated Jan. 6, 2014 issued in U.S. Appl. No. 13/951,443.

* cited by examiner

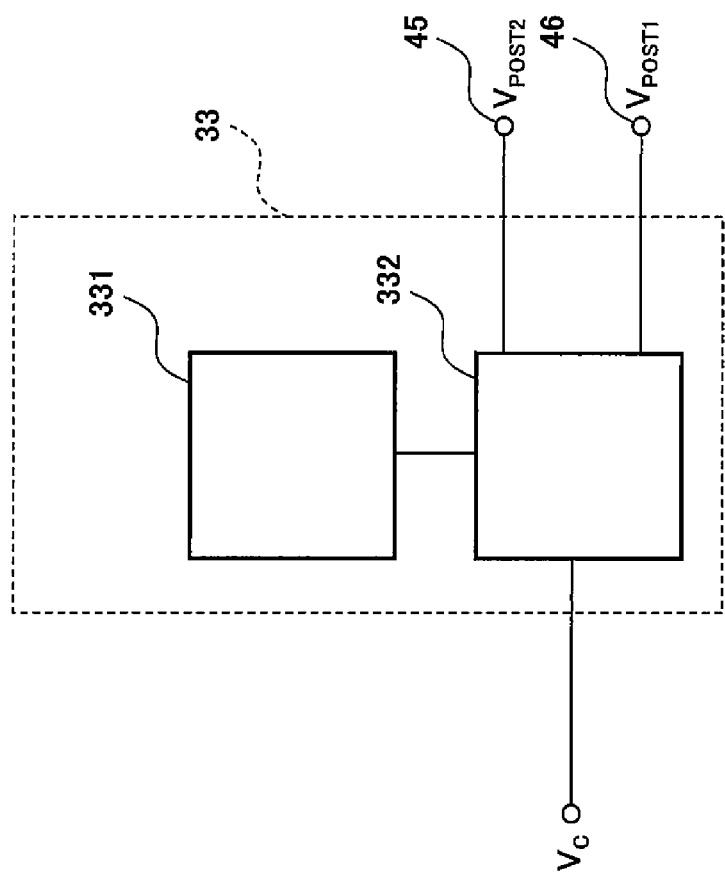

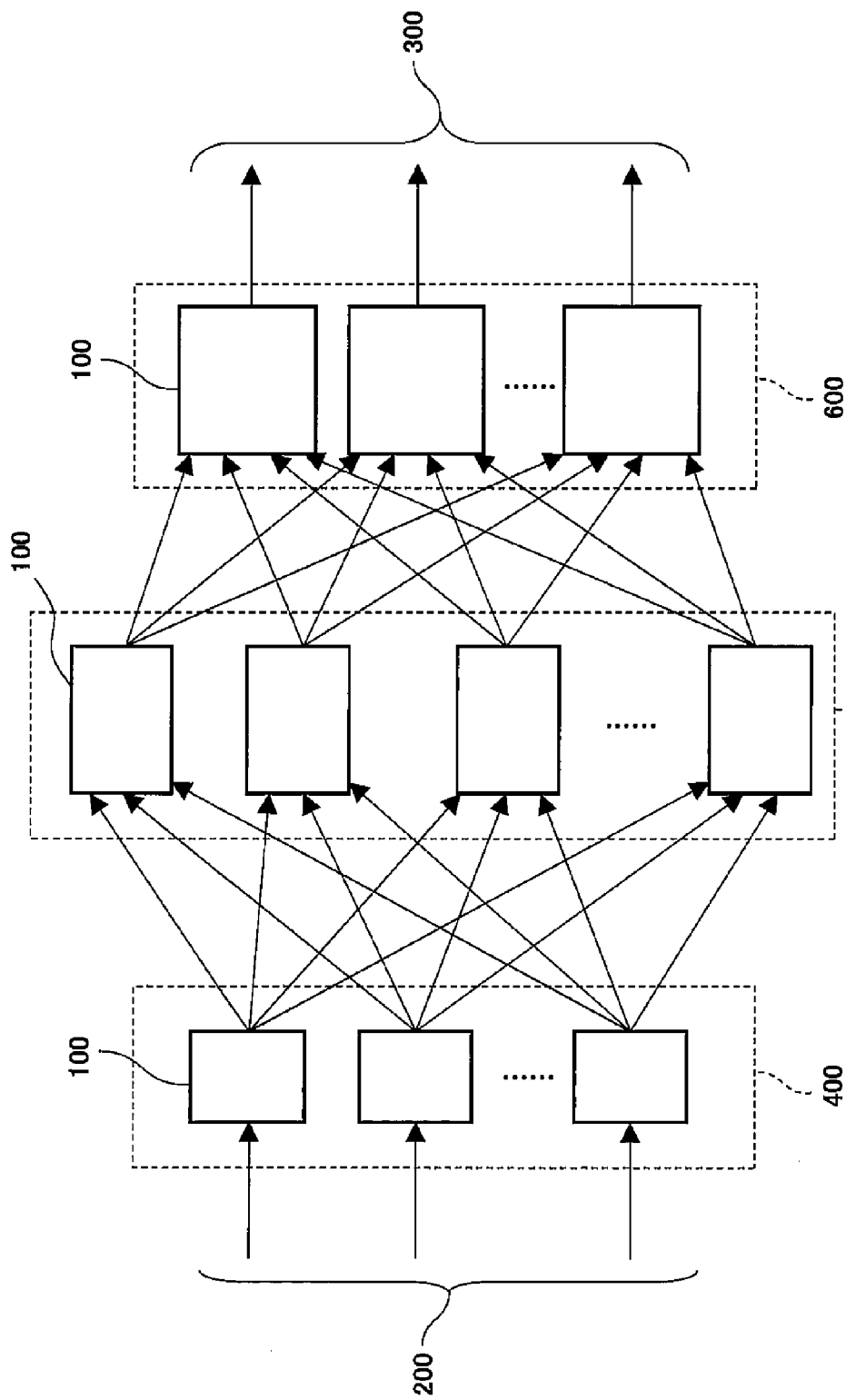

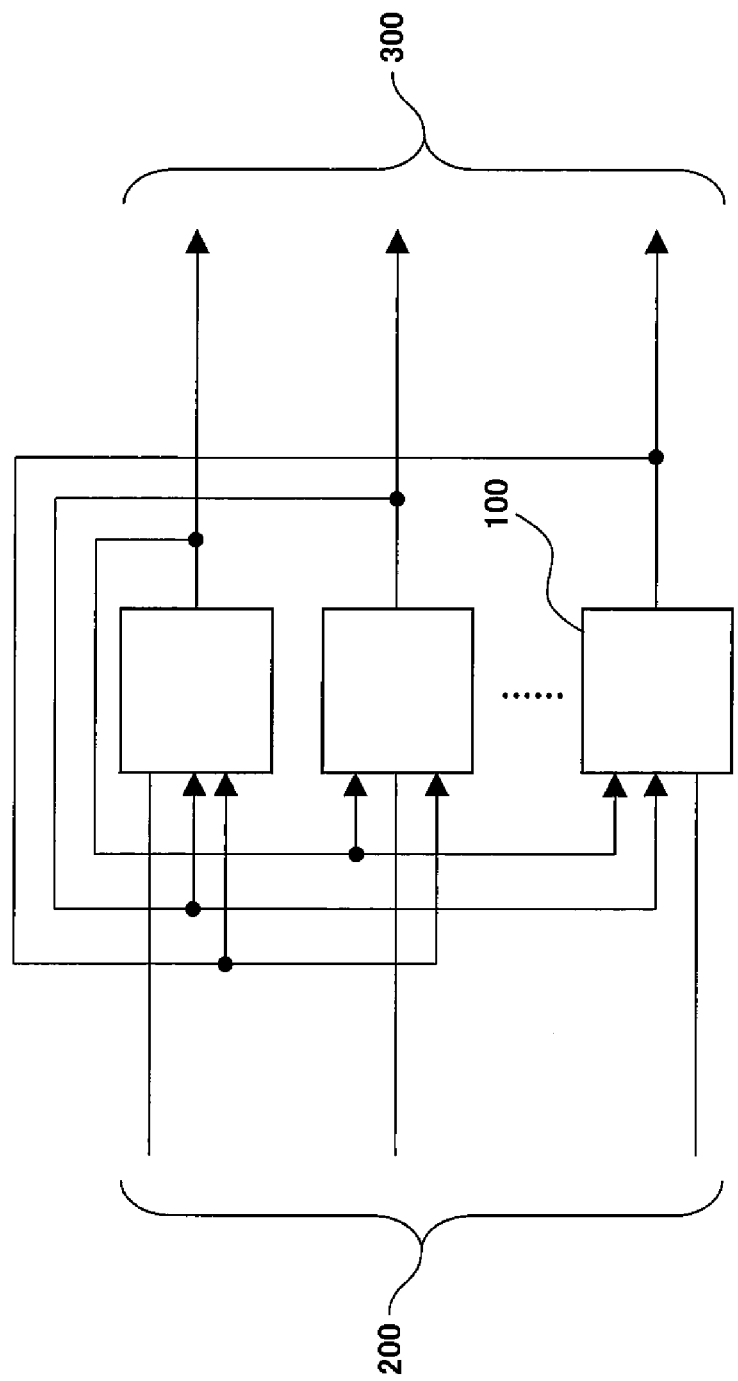

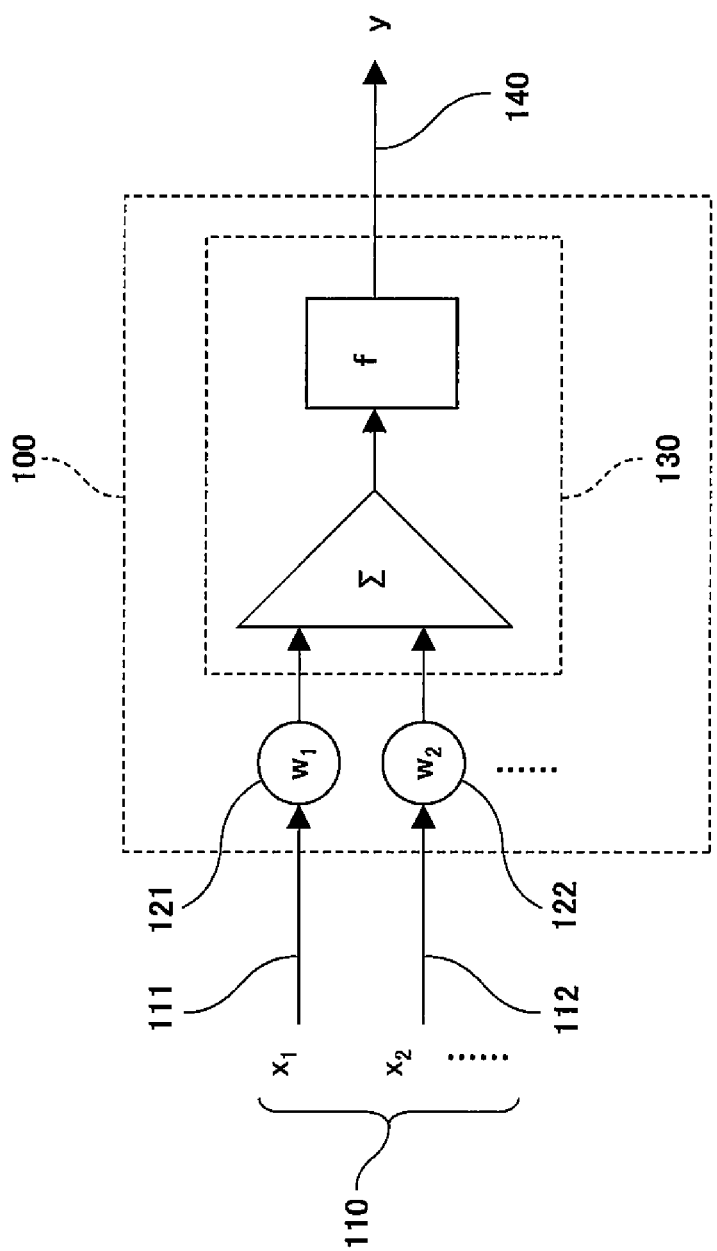

NEURAL NETWORK CIRCUIT AND LEARNING METHOD THEREOF

CROSS REFERENCE TO RELATED APPLICATION

This is a continuation application under 35 U.S.C. 111(a) of pending prior International Application No. PCT/JP2014/002570, filed on May 15, 2014, which in turn claims the benefit of Japanese Application No. 2013-140389, filed on Jul. 4, 2013, the disclosures of which Applications are incorporated by reference herein.

BACKGROUND OF THE DISCLOSURE

1. Field of the Invention

The present disclosure relates to a neural network circuit, and a learning method thereof.

2. Description of the Related Art

At present, computers which simulate information processing method of brains of living bodies have been studied. The most basic processing model of this is a neural network. Japanese Laid-Open Patent Application Publication No. Hei. 7-114524 (patent literature 1) discloses a model (pulse density model) which represents information using pulse densities. Patent literature 1 discloses that the model using pulses has a higher computing ability than a conventional model which does not use pulses. Also, Japanese Laid-Open Patent Application Publication No. Hei. 2010-146514 (patent literature 2) discloses a model (pulse timing model) which represents information using pulse timings.

Furthermore, as a neural network circuit which can implement a learning operation using pulse timings, with fewer elements, "Y. Nishitani et at., "Ferroelectric synapse device with brain-like learning function: Analog conductance control in a ferroelectric-gate field-effect transistor based on the timing difference between two pulses, "Extended Abstracts of the 2012 International Conference on Solid State Devices and Materials, J-4-3, pp. 1140-1141, 2012." (Non-patent literature 1) discloses a configuration.

SUMMARY OF THE INVENTION

However, in the neural network circuit which implements the pulse timing model disclosed in patent literature 2, when a plurality of neural network elements are connected to each other, it is necessary to transmit an analog signal (voltage pulse $V_{PRE1}$) between the neural network elements.

In the neural network, in general, as the neurons are more in number, the computing ability is higher. Therefore, by incorporating many neurons into hardware, a high processing ability is attained. On the other hand, because of a limitation on a process, the number of neurons which can be mounted on a single semiconductor chip is limited. For this reason, in a case where a neural network including neurons which are more in number than the upper limit is constructed, it becomes necessary to connect a plurality of semiconductor chips. Therefore, in the case of using the neural network circuit disclosed in non-patent literature 1, it is necessary to transmit the analog signal between the plurality of semiconductor chips.

For the above mentioned reason, the neural network circuit disclosed in non-patent literature 1 has a problem as follows. In a case where a neural network including the neurons which are more in number than the neurons which can be mounted on a single semiconductor chip is constructed, there may be a possibility that an analog voltage transmitted between the plurality of semiconductor chips changes due to a noise, and learning cannot be performed properly.

One non-limiting and exemplary embodiment is to provide a neural network circuit and a learning method thereof, which can perform a learning operation properly using pulse timings even when the number of neurons is large.

In one general aspect, the technique disclosed here is a neural network circuit including a plurality of neural network circuit elements which are interconnected, wherein each of the plurality of neural network circuit elements includes: at least one synapse circuit which receives as an input a first input signal output from another neural network circuit element; and one neuron circuit which receives as an input a signal output from the at least one synapse circuit; wherein the synapse circuit includes a variable resistance element; wherein the variable resistance element includes a first terminal, a second terminal, and a third terminal; wherein a resistance value between the first terminal and the second terminal changes in response to an electric potential difference between the first terminal and the third terminal; wherein the neuron circuit includes a waveform generating circuit for generating an analog pulse voltage having a specified waveform, which is output to the synapse circuit of the neural network circuit element including the neuron circuit, and a switching pulse voltage which has a waveform with a specified duration and is input as the first input signal to the synapse circuit of another neural network circuit element; wherein the synapse circuit is configured such that the analog pulse voltage generated in the neuron circuit of the neural network circuit element including the synapse circuit is input to the third terminal of the variable resistance element of the synapse circuit, for a permissible input period with the specified duration, in the first input signal from another neural network circuit element; and wherein the synapse circuit is configured such that the resistance value of the variable resistance element is changed in response to an electric potential difference between the first terminal and the third terminal, which occurs depending on a magnitude of the analog pulse voltage for the permissible input period.

According to the disclosure, it becomes possible to perform a learning operation properly using pulse timings even when the number of neurons is large.

The benefits and/or advantages may be individually provided by the various embodiments and features of the specification and drawings disclosure, and need not all be provided in order to obtain one or more of the same.

BRIEF DESCRIPTION OF THE DRAWINGS

FIG. 5 is a block diagram showing the example of a waveform generating circuit in the neuron circuit of the neural network circuit element of FIG. 1.

FIG. 20A is a view showing the schematic configuration of a hierarchical neural network.

FIG. 20B is a view showing the schematic configuration of an interconnected neural network.

FIG. 21 is a schematic view showing a general neuron.

DETAILED DESCRIPTION OF THE PREFERRED EMBODIMENT

[Explanation of Neural Network]

Figure 1:
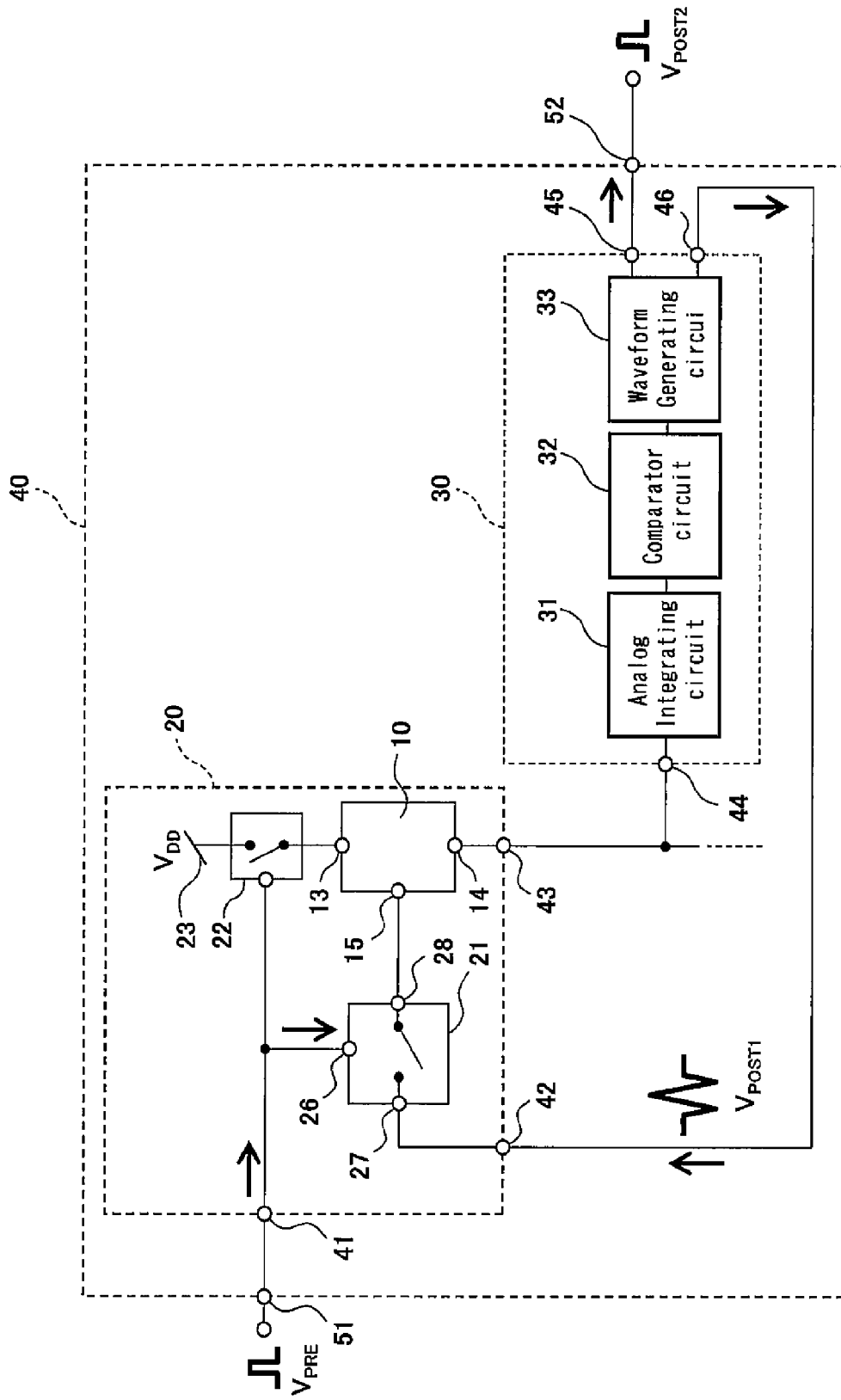
FIG. 1 is a block diagram showing the schematic configuration of a neural network circuit element of a neural network circuit according to Embodiment 1 of the present disclosure.

First of all, a detailed description will be given of a neural network which is the premise of the present embodiment of the present disclosure and a problem associated with the conventional neural network circuit which should be solved by the neural network of the present embodiment of the present disclosure. As described above, the neural network is a simulation of a neuron network of a living body. The neural network performs information processing in such a manner that a plurality of neurons which are a simulation of nerve cells as functional units in the neuron network are arranged in a network form. As examples of the neural network, there are a hierarchical neural network in which neurons 100 are connected in a layered form as shown in FIG. 20A, or an interconnected neural network (Hopfield network) in which the neurons 100 are interconnected as shown in FIG. 20B.

The neural network has major two functions. One of these functions is a "processing" function which derives an output from an input. The other of these functions is a "learning" function which sets a desired relation of input/output in the whole neural network.

[Processing Function]

Now, the operation in information processing will be described using the hierarchical neural network as an example. Referring now to FIG. 20A, the hierarchical neural network includes three layers which are an input layer 400, a hidden layer 500, and an output layer 600. Each of the input layer 400, the hidden layer 500, and the output layer 600 includes at least one neuron 100. The neuron(s) 100 in the input layer 400 is/are connected to the neuron(s) 100 in the hidden layer 500. In the same manner, the neuron(s) 100 in the hidden layer 500 is/are connected to the neuron(s) 100 in the output layer 600. Signals 200 are input to the input layer 400, propagate through the hidden layer 500, and then the output layer 600, and are output from the output layer 600. Each of the neurons 100 performs predetermined computation on an input value as will be described later, and propagates the resultant output value to the neurons 100 in the next layer. Therefore, the value output from the output layer 600 is a final output 300 of the neural network. This series of operation is information processing occurring in the neural network. If many neurons 100 are provided in the hidden layer 500, a desired input/output is attained. Although the hierarchical neural network of FIG. 20A includes the three layers, it may include a plurality of hidden layers 500.

Next, the neurons which are the functional units in the neural network will be described. FIG. 21 is a schematic view of a general neuron. Referring to FIG. 21, the neuron (particular neuron) 100 includes synapse sections 121 and 122, and a neuron section 130. The synapse sections 121 and 122 are equal in number to the neurons 100 in the previous stage to which the particular neuron 100 is connected, i.e., input signals. The synapse sections 121 and 122 weight (perform weighting on) a plurality of input signals 111 and 112 from outside, respectively. Weighting values ($w_1$, $w_2$) will be hereinafter referred to as synaptic weights. The neuron section 130 computes a value of a sum of the input signals weighted by the synapse sections 121 and 122, performs non-linear computation on the value of the sum, and outputs the resultant value. When the input signals from outside are expressed as $x_i$ (1, 2, ..., n), n is equal in number to the input signals. As represented by the following formula (1), the synapse sections 121 and 122 perform multiplication on the input signals, using the corresponding synaptic weight values $w_i$ (1, 2, ..., n), and the neuron section 130 computes a sum $V_n$ of the weighted values.

$$V_n = \Sigma w_i x_i \quad (1)$$

where $\Sigma$ is a summation sign of i.

The neuron section 130 performs non-linear computation on the sum $V_n$, using a non-linear function f, and derives an output y. Therefore, the output y of the neuron section 130 is represented by the following formula (2):

$$y = f(Vn) \quad (2)$$

As the non-linear function f, a monotonically increasing function having saturation characteristics is used. For example, a step function or a sigmoid function is used.

In the neural network circuit, the plurality of neuron circuits are able to perform computation concurrently. Therefore, the neural network circuit has a parallel processing ability. That is, unlike serial information processing of the conventional computer, the neural network circuit is able to perform parallel information processing, which is one of the features of the neural network.

[Learning Function]

In addition to the above mentioned processing function which derives the output from the input, the neural network has the "learning function" which is an important feature. As defined herein, the learning refers to updating of the above stated synaptic weights of the synapse sections, and setting of a desired input/output relation in the whole neural network circuit.

[Pulse Neuron Model]

Thus far, the processing function and the learning function of the neural network have been described in detail. In the model described above, the signals propagating between the neurons are current or electric potential values represented by analog value forms. On the other hand, it is known that nerve cells of the living body communicate (give and take) pulses (spike pulses) of a substantially fixed shape. Accordingly, there has been proposed a model (spiking neuron model) which truly simulates the neural circuit of the living body and directly handles the pulses. The spiking neuron model includes, for example, a model (pulse density model) representing analog information using the number of pulses propagating for a specified period and a model (pulse timing model) representing analog information using time intervals between pulses. The spiking neuron model can attain a higher computation capability than the conventional neutral network model using a sigmoid function. In the spiking neuron model, the signal communicated between neurons has a fixed waveform. Therefore, the spiking neuron model can easily implemented as hardware as will be described later, which is an advantage.

Figure 22:
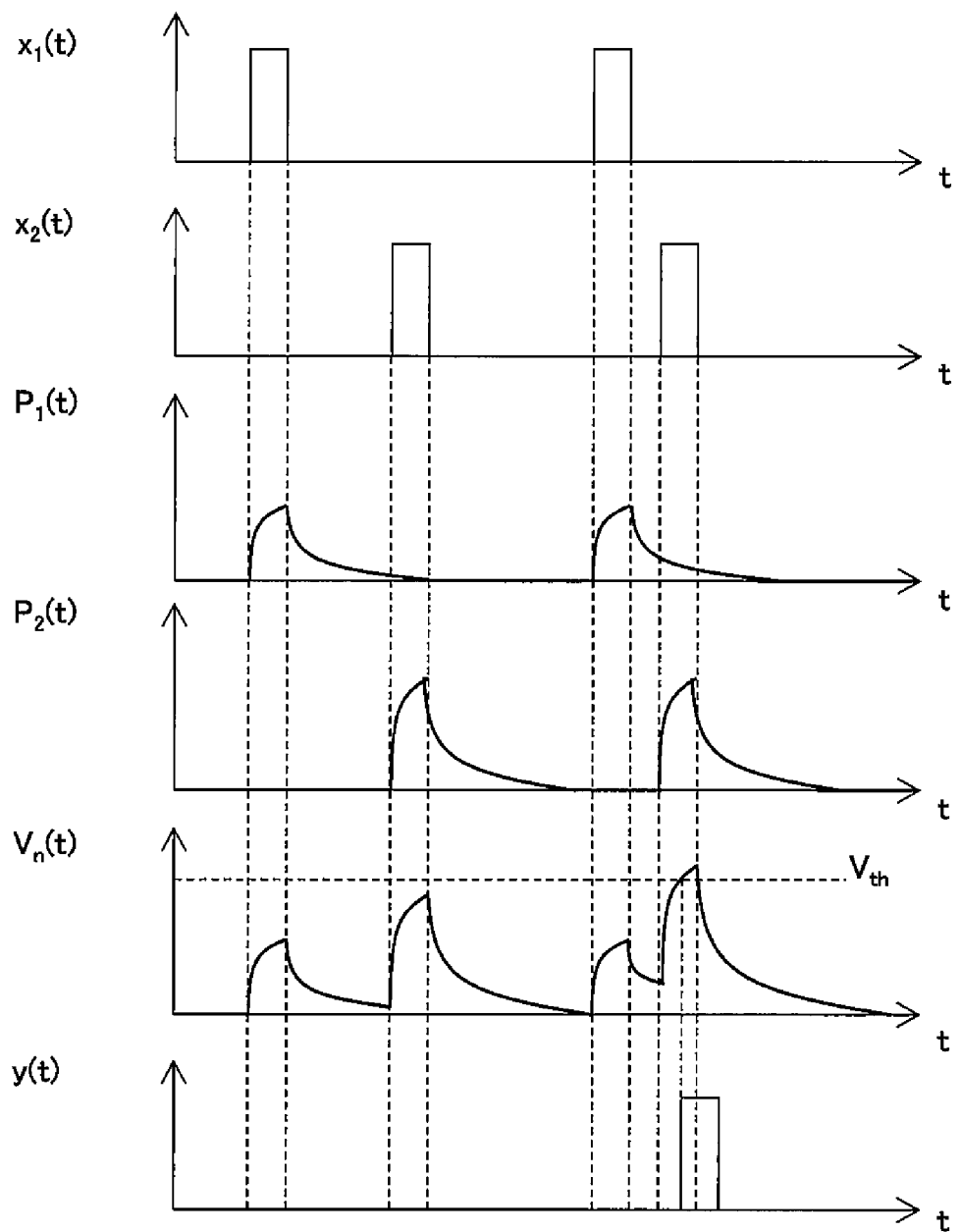
FIG. 22 is a graph showing temporal changes of values in a neuron section having two input terminals.

As the operation model of the neuron section which is applicable to the information representation using the pulses, there has been proposed an integrate-and-fire model. FIG. 22 is a graph showing temporal changes of values in the neuron section having two input terminals.

Referring to FIG. 22, from outside or another neuron sections, a pulse $x_1$ is input to the synapse section 121 and a pulse $x_2$ is input to the synapse section 122. At timings at which the pulses $x_1$ and $x_2$ are input to the synapse sections 121 and 122, respectively, a single-peaked voltage change occurs in each of the synapse sections 121 and 122. Such an electric potential in the synapse section 121 and 122, is referred to as a post-synaptic potential (hereinafter abbreviated as "PSP"). FIG. 22 indicate a change $P_1$ (t) in the PSP in the synapse section 121 and a change $P_2(t)$ in the PSP in the synapse section 122, respectively, which change occur with time. The height of the PSP is proportional to strength of the synaptic weight. t indicates time.

The neuron section computes a sum of the PSPs from all of the synapse sections connected to the neuron section. The sum is referred to as an internal electric potential $V_n(t)$ of the neuron section. In a case where the neuron section has two input terminals, the internal electric potential $V_n(t)$ is a sum of $P_1$ (t) and $P_2(t)$, as can be seen from FIG. 22. In general, the internal electric potential $V_n(t)$ is represented by the following formula (3):

$$V_n(t) = \Sigma P_i(t) \quad (3)$$

where $P_i$ is the PSP in the synapse section i, and $\Sigma$ is a summation sign of i.

As shown in FIG. 22, when the internal electric potential $V_n(t)$ exceeds a predetermined threshold $V_{th}$, the corresponding neuron section outputs the pulse signal y. This is called "fire" of the neuron section. The pulse signal output y is output from the neuron section, and input to other neuron sections.

In a case where information representation using the pulse timings is used, the pulse timings can also be used in updating of the synaptic weight in the learning operation. Especially, a learning operation using a characteristic called "spike-timing dependent synaptic plasticity" (hereinafter will be abbreviated as "STDP") has attracted an attention. The STDP refers to a characteristic in which the synaptic weight of the synapse section 121 changes depending on the timing at which a neuron (previous neuron) which sends a signal to the synapse section 121 fires and a timing at which a neuron (post neuron) which receives a signal weighted by the synapse section 121 fires. Several kinds of STDPs of nerve cells of an actual living body have been observed.

Figure 23A:
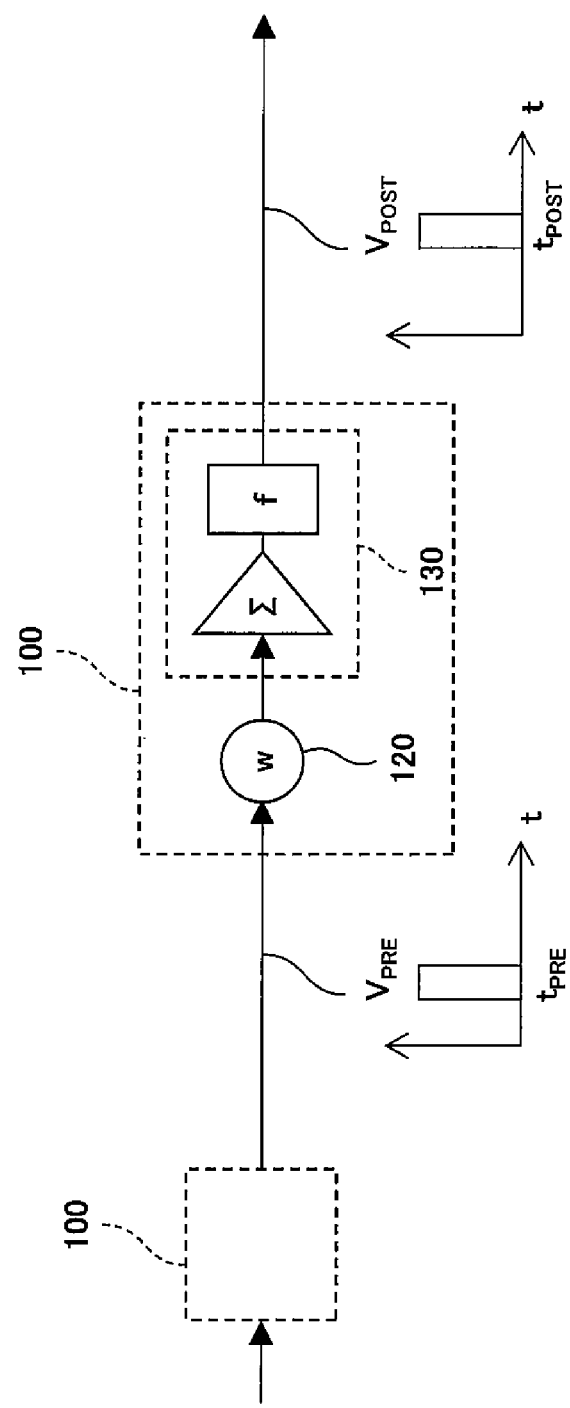
FIG. 23A is a schematic view for explaining the STDP.
Figure 23B:
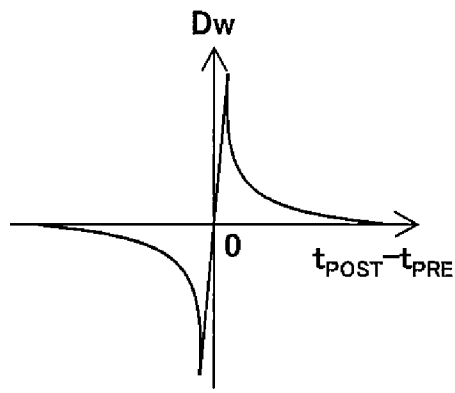
FIG. 23B is a waveform diagram showing the characteristic of the non-symmetric STDP.
Figure 23C:
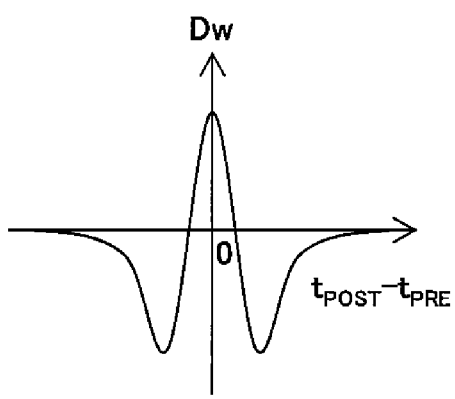
FIG. 23C is a waveform diagram showing the characteristic of the symmetric STDP.

With reference to FIG. 23A, the STDP will be described. As shown in FIG. 23A, the timing at which the previous neuron connected to the synapse section 120 fires is $t_{PRE}$ and the timing at which the post neuron connected to the synapse section 120 fires is $t_{POST}$. The STDP is a characteristic in which the synaptic weight w of the synapse changes according to a time difference ($t_{POST} - t_{PRE}$) which is a difference between $t_{PRE}$ and $t_{POST}$, as a function. Roughly, there are two kinds of STDPs. The characteristic of FIG. 23B is non-symmetric STDP, in which a change amount $\Delta w$ of the synaptic weight w depends on the temporal order of the two pulses in addition to the time difference ($t_{POST} - t_{PRE}$) between these pulses. The characteristic of FIG. 23C is symmetric STDP, in which a change amount $\Delta w$ of the synaptic weight w is determined by only a function of the time difference ($t_{POST} - t_{PRE}$) between the two pulses and does not depend on the order of the pulses.

[Configuring of Integrated Circuit]

Thus far, the outline of the neutral network has been described in detail. How the above mentioned functions of the neurons are implemented becomes an issue in configuring of the neural network. In the past, a method of implementing the functions of the neurons in software processing, using the conventional computer, has been employed in many cases. However, in this case, a CPU executes processing in a plurality of neurons by time division. Therefore, the parallel information processing is not executed. Because of this, it is essential that neurons be constructed using hardware and configured into an integrated circuit.

As described above, it is suggested that the neural network based on the information representation using the pulse timings is able to implement high performance. Since the signals communicated between the neurons are fixed-waveform signals, the neural network is easily configured into hardware. Because of this, in recent years, implementation of the neural network as hardware incorporating the learning function using the STDP, i.e., implementation of the neural network circuit has been studied vigorously.

Figure 24:
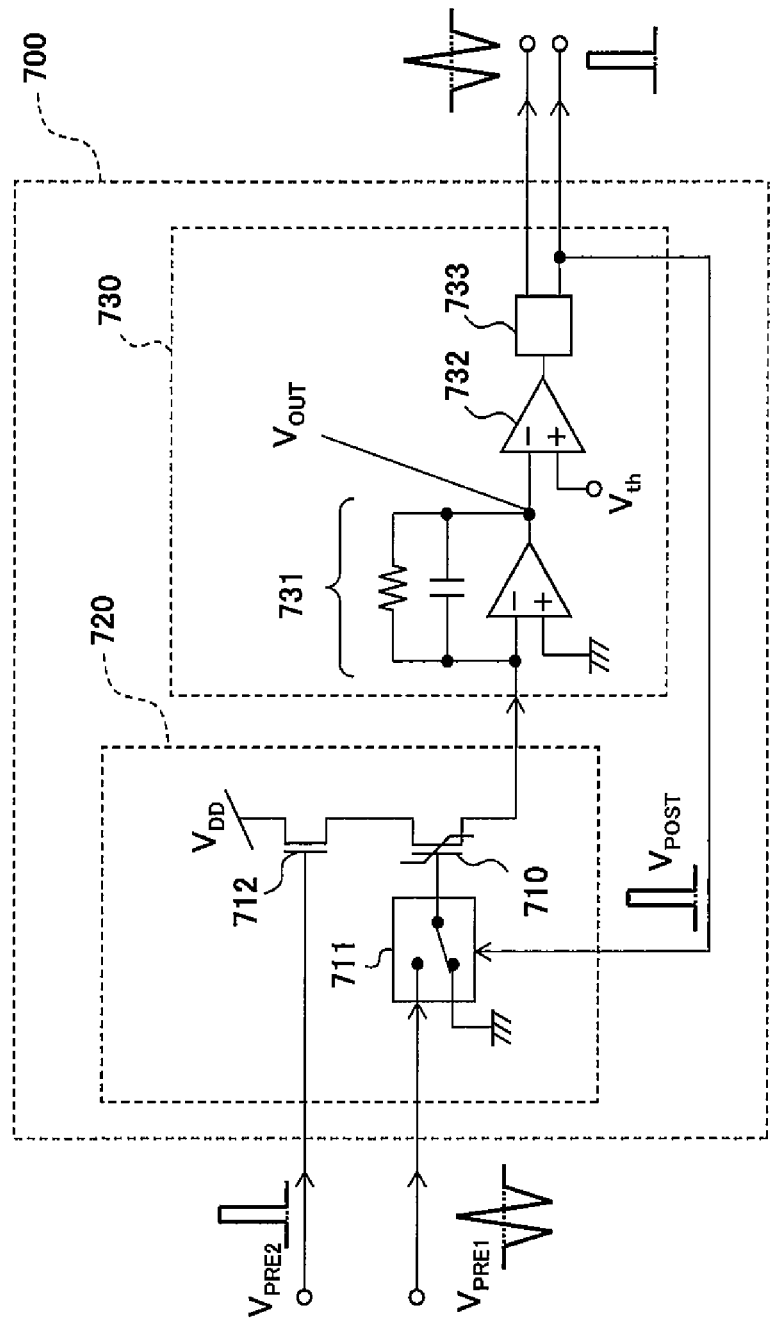
FIG. 24 is a circuit diagram showing a conventional neural network circuit element disclosed in non-patent literature 1.

Non-patent literature 1 discloses the example (neural network circuit element) which implements the neuron which is operative based on the spiking neuron model, by hardware. FIG. 24 is a circuit diagram showing a conventional neural network circuit element 700 disclosed in FIG. 3(a) of the non-patent literature 1. The neural network circuit element 700 corresponds to the above stated neuron 100.

As shown in FIG. 24, the neural network circuit element 700 includes a synapse circuit 720, and a neuron circuit 730. The synapse circuit 720 corresponds to the above stated synapse section 120, and the neuron circuit 730 corresponds to the above stated neuron section 130. The synapse circuit 720 includes a ferroelectric memristor 710, a selector circuit 711, and a switching transistor 712. The ferroelectric memristor 710 has a function of storing its resistance value as a synaptic weight.

The neuron circuit 730 includes an analog integrating circuit 731, a comparator circuit 732, and a waveform generating circuit 733. The waveform generating circuit 733 applies a pulse voltage $V_{POST}$ as feedback-input to the selector circuit 711 within the neural network circuit element 700 including this waveform generating circuit 733.

Thus, in accordance with the non-patent literature 1, the selector circuit 711 is controlled by using the pulse voltage $V_{POST}$ applied to the selector circuit 711 as the feedback input, to perform switching whether or not a voltage pulse signal $V_{PRE1}$ is permitted to be input to a gate electrode 742 of the ferroelectric memristor 710. In this way, a learning function is implemented.

As described above, in the conventional neural network circuit disclosed in the non-patent literature 1, as shown in FIG. 24, the neural network circuit element 700 has two input signals and two output signals, and it is necessary to mutually transmit the two pulse signals when the neural network circuit elements 700 are interconnected. One of the two pulse signals is the digital signal and the other is the analog signal.

The analog signal input to the neural network circuit element 700 is a signal in which the magnitude (volt) of the voltage forming the analog waveform is significant, and the digital signal input to the neural network circuit element 700 is a signal in which the magnitude relationship (HIGH or LOW) of the voltage is significant.

As should be appreciated, in the configuration of the non-patent literature 1, it is necessary to transmit the analog signal in the signal transmission between the neural network circuit elements 700. Therefore, in the case where the neural network circuit is constructed on a plurality of semiconductor chips using the conventional neural network circuit disclosed in the non-patent literature 1, it is necessary to transmit the analog signal between the semiconductor chips as described above.

However, in the transmission of the voltage signal between the semiconductor chips, due to the resistive component or capacitive component of a wire between the semiconductor chips, the effects of attenuation or strain of the signal are more than in the transmission of the voltage signal within the semiconductor chip. As described above, the magnitude of the voltage is important in the analog signal used in the neural network circuit element, and therefore the analog signal is susceptible to a noise such as the attenuation or strain.

Because of the above fact, in the neural network circuit disclosed in the non-patent literature 1, in the case where the neural network including neurons which are more in number than the neurons which can be incorporated into a single semiconductor chip, is constructed, the analog signal may change due to a noise, and as a result, learning cannot be performed properly.

In view of the above described problem associated with the prior art, the inventors of the present disclosure intensively studied, and conceived the following aspects, as a neural network circuit and a learning method thereof, which can perform a learning operation properly using pulse timings even when the number of neurons is large.

The inventors of the present disclosure paid an attention to the fact that in the conventional neural network circuit element 700, it is switched whether or not a voltage pulse signal $V_{PRE1}$ generated in another neural network circuit element is permitted to be input to the gate electrode, to generate the voltage signal for changing the synaptic weight according to a timing difference between the two pulses, by using the feedback pulse voltage $V_{POST}$ generated in the neural network circuit element 700 to which the voltage pulse signal $V_{PRE1}$ is input. The inventors of the present disclosure discovered the finding that regarding the situation in which two pulse signals generated in two different neural network circuit elements are required in order to realize the STDP learning, one of the two pulse signals may have a signal waveform which allows the switching to be performed, and this pulse signal is less susceptible to a noise when this pulse signal is transmitted between the semiconductor chips.

As a result, the inventors of the present disclosure conceived the present disclosure in which it becomes unnecessary to transmit between the semiconductor chips the analog pulse signal which is affected by the noise, by feeding-back the analog pulse signal within the neural network circuit element and by using the pulse signal transmitted from another neural network circuit element as a signal used for performing switching whether or not the analog pulse signal is permitted to be input to the variable resistance element.

Specifically, according to an aspect of the present disclosure, there is provided a neural network circuit including a plurality of neural network circuit elements which are interconnected, wherein each of the plurality of neural network circuit elements includes: at least one synapse circuit which receives as an input a first input signal output from another neural network circuit element; and one neuron circuit which receives as an input a signal output from the at least one synapse circuit; wherein the synapse circuit includes a variable resistance element; wherein the variable resistance element includes a first terminal, a second terminal, and a third terminal; wherein a resistance value between the first terminal and the second terminal changes in response to an electric potential difference between the first terminal and the third terminal; wherein the neuron circuit includes a waveform generating circuit for generating an analog pulse voltage having a specified waveform, which is output to the synapse circuit of the neural network circuit element including the neuron circuit, and a switching pulse voltage which has a waveform with a specified duration and is input as the first input signal to the synapse circuit of another neural network circuit element; wherein the synapse circuit is configured such that the analog pulse voltage generated in the neuron circuit of the neural network circuit element including the synapse circuit is input to the third terminal of the variable resistance element of the synapse circuit, for a permissible input period with the specified duration, in the first input signal from another neural network circuit element; and wherein the synapse circuit is configured such that the resistance value of the variable resistance element is changed in response to an electric potential difference between the first terminal and the third terminal, which occurs depending on a magnitude of the analog pulse voltage for the permissible input period.

In accordance with this configuration, of the analog pulse voltage and a pulse voltage for switching with a specified duration, which are generated in a particular neural network circuit element, the pulse voltage for switching is transmitted to another neural network circuit element, while the analog pulse voltage is used in the particular neural network circuit element. Therefore, only the pulse voltage for switching which is less susceptible to a noise, is transmitted between a plurality of neural network circuit elements. As a result, a learning operation can be performed properly using pulse timings even when the number of neurons is large.

The plurality of neural network circuit elements may be mounted on a plurality of chips; and the plurality of chips may be configured such that an output terminal of at least one neural network circuit element mounted on one chip is connected to an input terminal of at least one neural network circuit element mounted on another chip. In this configuration, only the pulse voltage for switching which is less susceptible to a noise, is transmitted between the plurality chips. Therefore, even when many neural network circuit elements constituting the neural network circuit are mounted over the plurality of chips, the signal transmission between the chips is less affected by the noise. Therefore, even when the neural network circuit elements which can be mounted on one chip are limited in number, it becomes possible to realize the neural network circuit which can incorporate more neural network circuit elements and perform a proper learning operation.

The synapse circuit may include a first switch which performs switching of connection or disconnection between the third terminal of the variable resistance element and a terminal of the neuron circuit from which the analog pulse voltage is output; and the first switch may perform switching of the connection or the disconnection in response to the first input signal from another neural network circuit element. In this configuration, the first input signal from another neural network circuit element is used for only the switching of the connection state of the first switch. Therefore, it is sufficient that the first input signal has an accuracy which allows a binary value to be identified. As a result, in the transmission between the plurality of neural network circuit elements, the first input signal is less affected by a noise.

The variable resistance element may be a ferroelectric gate transistor. The ferroelectric gate transistor may include a control electrode provided on a substrate; a ferroelectric layer provided such that the control electrode is in contact with the ferroelectric layer, a semiconductor layer provided on the ferroelectric layer, and a first electrode and a second electrode which are provided on the semiconductor layer; and the ferroelectric gate transistor may be configured such that a resistance value between the first electrode and the second electrode changes in response to an electric potential difference between the first electrode and the control electrode. In this configuration, when a voltage is applied between the control electrode as the third terminal and the first electrode as the first terminal, the resistance value between the first electrode and the second electrode as the second terminal changes in a non-volatile manner, and in multiple gradations, depending on the polarization direction of the ferroelectric layer. Therefore, by using the ferroelectric gate transistor as the variable resistance element, the synaptic weight change can be stored in multiple gradations.

The neuron circuit includes an integrating circuit which integrates a value of a current flowing through the variable resistance element of the synapse circuit; and a waveform generating circuit which generates a specified pulse voltage corresponding to the value of the current which is integrated by the integrating circuit.

The synapse circuit may include a second switch, one end of which is connected to a first reference voltage source and the other end of which is connected to the first terminal of the variable resistance element; and the second switch may be configured to connect the first reference voltage source to the first terminal for a period during which the pulse voltage input from another neural network circuit element is input to the second switch.

According to another aspect of the present disclosure, there is provided a method of learning in a neural network circuit including a plurality of neural network circuit elements which are interconnected, wherein each of the plurality of neural network circuit elements includes: at least one synapse circuit which receives as an input a first input signal output from another neural network circuit element; and one neuron circuit which receives as an input a signal output from the at least one synapse circuit; wherein the synapse circuit includes a variable resistance element; wherein the variable resistance element includes a first terminal, a second terminal, and a third terminal; wherein a resistance value between the first terminal and the second terminal changes in response to an electric potential difference between the first terminal and the third terminal; wherein the neuron circuit includes a waveform generating circuit for generating an analog pulse voltage having a specified waveform, which is output to the synapse circuit of the neural network circuit element including the neuron circuit, and a switching pulse voltage which has a waveform with a specified duration and is input as the first input signal to the synapse circuit of another neural network circuit element; wherein the synapse circuit is configured such that the analog pulse voltage generated in the neuron circuit of the neural network circuit element including the synapse circuit is input to the third terminal of the variable resistance element of the synapse circuit, for a permissible input period with the specified duration, in the first input signal from another neural network circuit element; and wherein the synapse circuit is configured such that the resistance value of the variable resistance element is changed in response to an electric potential difference between the first terminal and the third terminal, which occurs depending on a magnitude of the analog pulse voltage for the permissible input period.

Hereinafter, the learning method of the neural network circuit according to the embodiments of the present disclosure will be described with reference to the drawings.

Embodiment 1

Figure 2:
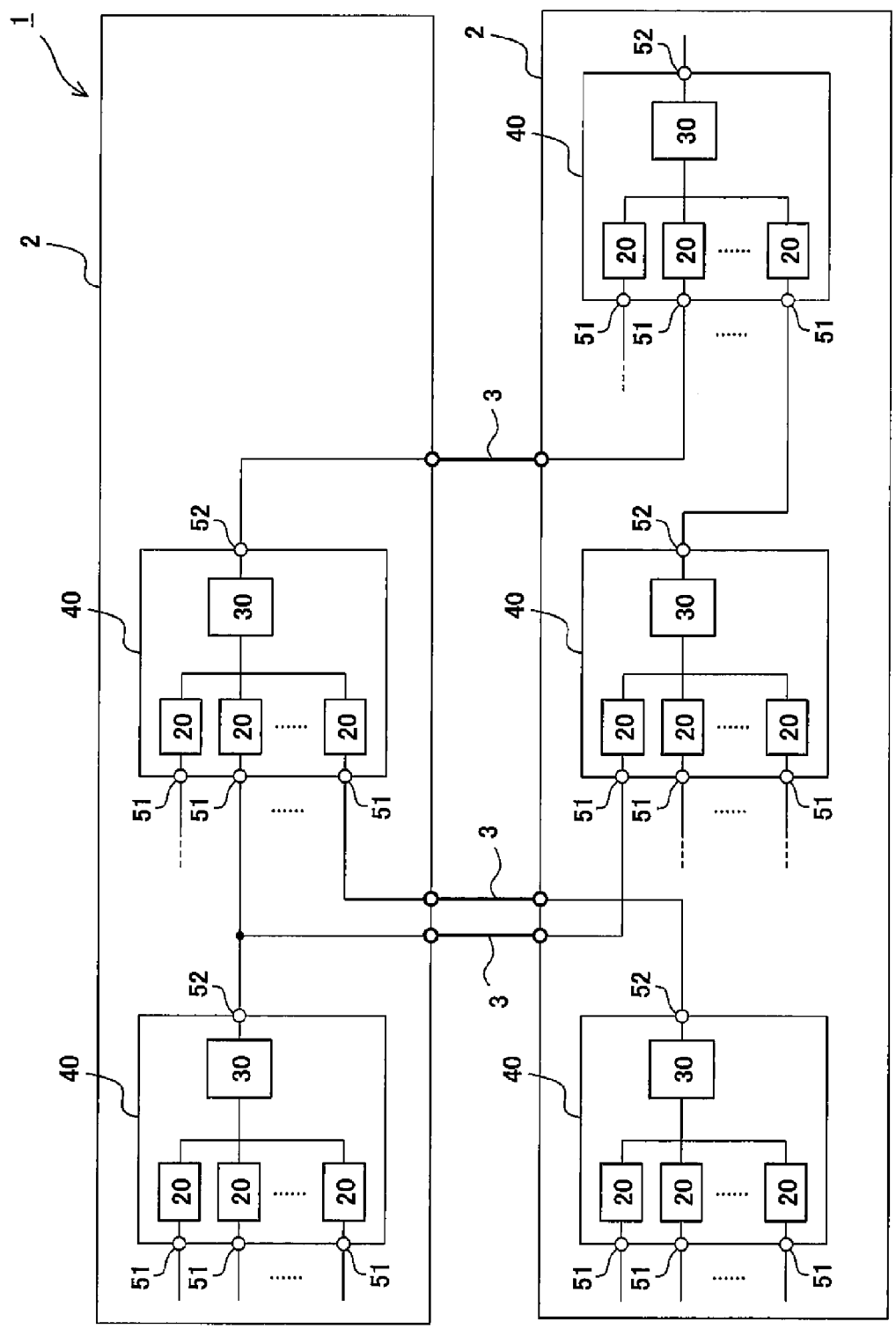
FIG. 2 is a block diagram showing the exemplary configuration of the neural network circuit incorporating the neural network circuit element of FIG. 1.

First of all, Embodiment 1 of the present disclosure will be described. FIG. 1 is a block diagram showing the schematic configuration of a neural network circuit element 40 included in a neural network circuit according to Embodiment 1 of the present disclosure. FIG. 2 is a block diagram showing the exemplary configuration of the neural network circuit 1 incorporating the neural network circuit element 40 of FIG. 1. As shown in FIG. 1, the neural network circuit element 40 of the present embodiment includes at least one input terminal 51, a synapse circuit 20 which is equal in number to the input terminal 51, one neuron circuit 30, and one output terminal 52. As shown in FIG. 2, the neural network circuit 1 is configured to include a plurality of neural network circuit elements 40 which are interconnected. Specifically, the output terminal 52 of the neural network circuit element 40 is connected to the input terminal 51 of another neural network circuit element 40.

The input terminal 51 of the neural network circuit element 40 is connected to the input terminal 41 of the synapse circuit 20. The output terminal 43 of the synapse circuit 20 is connected to the input terminal 44 of the neuron circuit 30. The first output terminal 45 of the neuron circuit 30 is connected to the output terminal 52 of the neural network circuit element 40. For easier illustration, only one neuron circuit 30 and one synapse circuit 20 are shown in FIG. 1. However, actually, as shown in FIG. 2, a plurality of synapse circuits 20 are connected to one neuron circuit 30.

The neuron circuit 30 includes an analog integrating circuit 31, a comparator circuit 32, and a waveform generating circuit 33.

Figure 3:
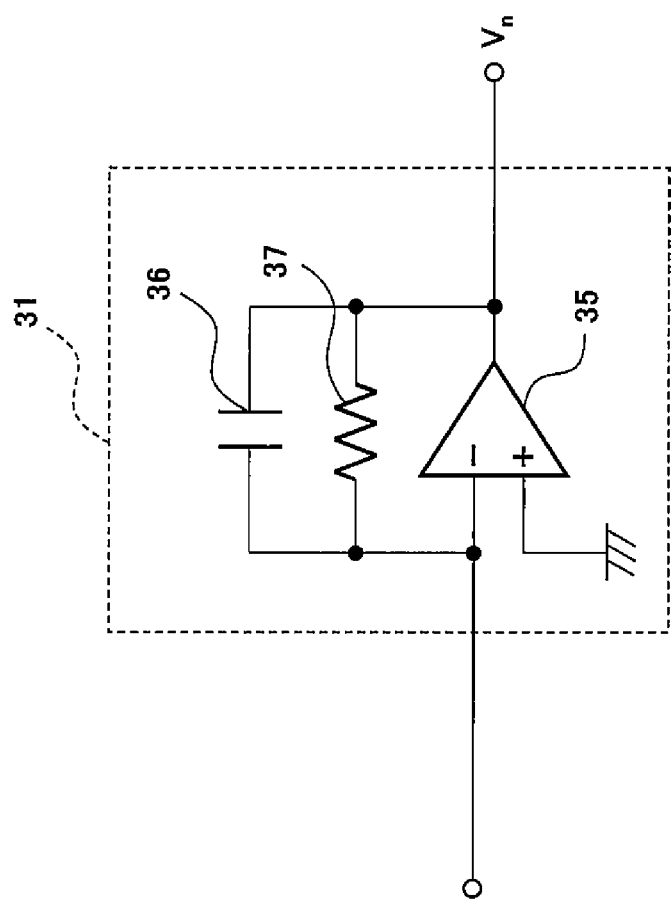
FIG. 3 is a circuit diagram showing the example of an analog integrating circuit of FIG. 1.

The input terminal 44 of the neuron circuit 30 is connected to the analog integrating circuit 31. The analog integrating circuit 31 computes a sum of currents flowing from the plurality of synapse circuits 20 connected to the neuron circuit 30. FIG. 3 is a circuit diagram showing the example of the analog integrating circuit 31 of FIG. 1. In the example of FIG. 3, the analog integrating circuit 31 includes an operational amplifier 35, a capacitor 36, and a resistive element 37. The capacitance value of the capacitor 36 is, for example, 1 pF. The resistance value of the resistive element 37 is, for example, 1 MΩ. The positive input terminal (+) of the operational amplifier 35 is placed at an electric potential which is equal to that of a ground voltage, while the negative input terminal (−) of the operational amplifier 35 is connected to the input terminal 44 of the neuron circuit 30. The capacitor 36 and the resistive element 37 are connected in parallel between the negative input terminal (−) of the operational amplifier 35 and the output terminal of the operational amplifier 35.

The analog integrating circuit 31 charges the capacitor 36 with a current input from the synapse circuit 20 to the neuron circuit 30. By this operation, a result of temporal integration of the current is output as an integrated voltage $V_n$. The operational amplifier 35 has a feedback function in which a signal output from the operational amplifier 35 is returned to the negative input terminal (−) of the operational amplifier 35 via the resistive element 37. This allows the negative input terminal (−) of the operational amplifier 35 to be virtually grounded.

Since the negative input terminal (−) of the operational amplifier 35 is virtually grounded, a constant current determined by the first reference voltage $V_{DD}$ of a DC voltage source 23 and the resistance value of the variable resistance element 10 is input to the neuron circuit 30 and accumulated therein, regardless of the number of the synapse circuits 20 or the integrated voltage $V_n$ of the capacitor 36.

The computation value of the analog integrating circuit 31 is sent to the comparator circuit 32. When the computation value exceeds a predetermined value, the comparator circuit 32 outputs a signal (trigger signal) to the waveform generating circuit 33.

Figure 4A:
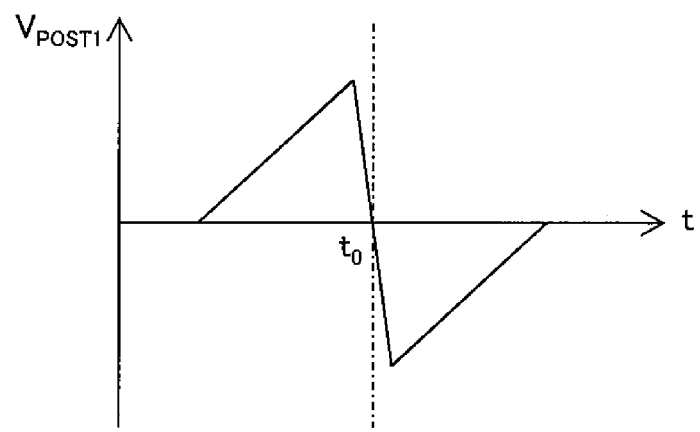
FIG. 4A is a view showing the exemplary waveform of a non-symmetric analog pulse voltage used in the neural network circuit element of FIG. 1.
Figure 4B:
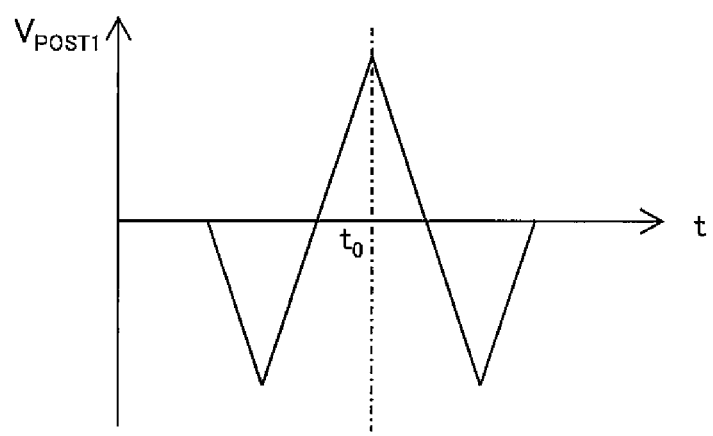
FIG. 4B is a view showing the exemplary waveform of a symmetric analog pulse voltage used in the neural network circuit element of FIG. 1.
Figure 4C:
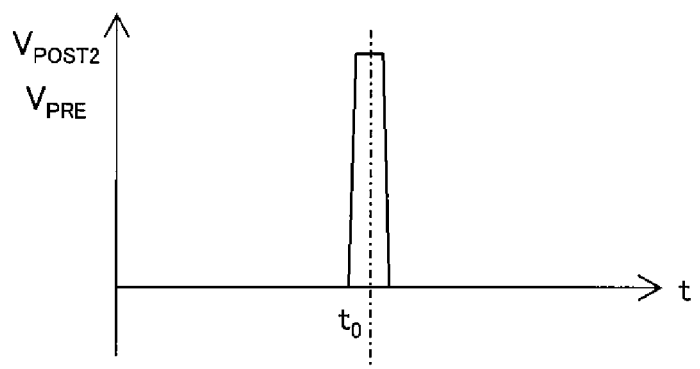
FIG. 4C is a view showing the exemplary waveform of a switching pulse voltage used in the neural network circuit element of FIG. 1.

In response to the signal output from the comparator circuit 32, as the trigger, the waveform generating circuit 33 generates an analog pulse voltage $V_{POST1}$ having a specified waveform, and a switching pulse voltage $V_{POST2}$ having a waveform with a specified duration. FIGS. 4A and 4B are views showing the exemplary waveforms of the analog pulse voltage $V_{POST1}$ used in the neural network circuit element 40 of FIG. 1. FIG. 4C is a view showing the exemplary waveform of the switching pulse voltage $V_{POST2}$ used in the neural network circuit element 40 of FIG. 1.

Now, the analog pulse voltage of FIG. 4A will be referred to as "bipolar sawtooth pulse voltage". The bipolar sawtooth pulse voltage has a characteristic in which an electric potential which is initially 0V increases to a predetermined positive electric potential with a passage of time, then decreases to a predetermined negative electric potential, and then returns to 0V. By comparison, the analog pulse voltage of FIG. 4B will be referred to as "mexican-hat pulse voltage". The mexican-hat pulse voltage has a characteristic in which an electric potential which is initially 0V decreases to a predetermined negative electric potential with a passage of time, then rises to a predetermined positive electric potential, then decreases to a predetermined negative electric potential, and then returns to 0V. As the analog pulse voltage $V_{POST1}$, for example, the waveform formed by inverting the sign of the waveform of FIG. 4A or FIG. 4B, as well as the waveform of FIG. 4A or FIG. 4B, may be used. As the switching pulse voltage $V_{POST2}$, the waveform indicating HIGH level or LOW level may be used. The switching pulse voltage $V_{POST2}$, may be a digital waveform or an analog waveform so long as it defines the duration of HIGH level or LOW level. As the switching pulse voltage $V_{POST2}$, for example, a square wave pulse voltage is shown in FIG. 4C

The waveform generating circuit 33 generates the analog pulse voltage $V_{POST1}$ and the switching pulse voltage $V_{POST2}$, at the same timing. Specifically, the waveform generating circuit 33 outputs the analog pulse voltage $V_{POST1}$ and the switching pulse voltage $V_{POST2}$ such that the temporal mid point of the analog pulse voltage $V_{POST1}$ and the temporal mid point of the switching pulse voltage $V_{POST2}$ coincide with each other (mid points are represented by $t_0$ in FIGS. 4A, 4B, and 4C).

FIG. 5 is a block diagram showing the example of the waveform generating circuit 33 in the neuron circuit 30 of the neural network circuit element 40 of FIG. 1. As shown in FIG. 5, the waveform generating circuit 33 includes a D/A converter 331 which is activated in response to the signal $V_c$ output from the comparator circuit 32 as a trigger, and a digital memory 332 for storing digital waveform data used to generate the analog pulse voltage. Upon inputting of the signal $V_c$ output from the comparator circuit 32 to the D/A converter 331, the D/A converter 331 reads digital waveform data from the digital memory 332, converts the digital waveform data into analog waveform data and outputs the analog waveform data to the second output terminal 46. As shown in FIG. 1, the analog pulse voltage $V_{POST1}$ output from the second output terminal 46 is feedback-input to all of the synapse circuits 20 within the neural network circuit element 40 including the neuron circuit 30 which has output the analog pulse voltage $V_{POST1}$. In FIG. 2, wires through which the signal is feedback-input from the neuron circuit 30 to the synapse circuits 20 are omitted.

The switching pulse voltage $V_{POST2}$ is generated in the waveform generating circuit 33 in the same manner and output from the first output terminal 45. The first output terminal 45 of the neuron circuit 30 is connected to the output terminal 52 of the neural network circuit element 40. Therefore, the switching pulse voltage $V_{POST2}$ is the signal output from the neural network circuit element 40. This signal is input as a first input signal (i.e., switching pulse voltage $V_{PRE}$) to the input terminal 51 of the synapse circuit 20 of another neural network circuit element 40.

Next, the synapse circuit 20 of the present embodiment will be described. As shown in FIG. 1, the synapse circuit 20 includes the first switch 21, the second switch 22, the variable resistance element 10, and the DC voltage source 23 which outputs the specified first reference voltage (e.g., power supply voltage) $V_{DD}$. As shown in FIG. 2, the first input terminal 41 of the synapse circuit 20 in a particular neural network circuit element 40 is connected to the output terminal 52 of other particular neural network circuit element 40. The second input terminal 42 of the synapse circuit 20 is connected to the second output terminal 40 of the neuron circuit 30 within the neural network circuit element 40 including this synapse circuit 20.

As will be described later, the variable resistance element 10 includes a first terminal 13, a second terminal 14, and a third terminal 15, and is configured to change a resistance value between the first terminal 13 and the second terminal 14 in response to an electric potential difference between the first terminal 13 and the third terminal 15. The first terminal 13 of the variable resistance element 10 is connected to the DC voltage source 23 via the second switch 22. The second terminal 14 of the variable resistance element 10 is connected to the output terminal 43 of the synapse circuit 20. The output terminal 43 of the synapse circuit 20 is connected to the input terminal 44 of the neuron circuit 30 in the neural network circuit element 40 including this synapse circuit 20.

As the variable resistance element 10, a variable resistance element which does not change the resistance value even after application of the pulse voltage is stopped, i.e., has non-volatility, may be used. This allows the variable resistance element 10 to retain the resistance value after supplying of the voltage to the variable resistance element 10 is stopped.

The first switch 21 includes a first terminal 27 connected to the second input terminal 42 of the synapse circuit 20, a second terminal 28 connected to the third terminal 15 of the variable resistance element 10, and a control terminal 26 which is connected to the first input terminal 41 of the synapse circuit 20 and performs switching of connection or disconnection between the first terminal 27 and the second terminal 28.

Figure 6:
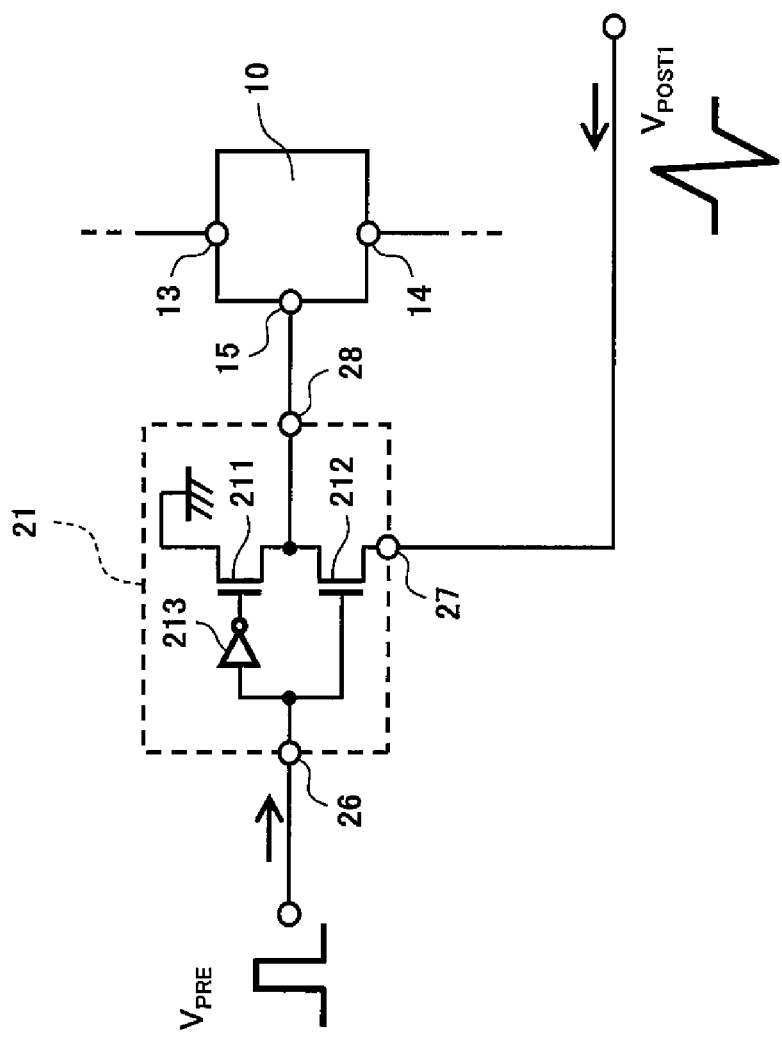
FIG. 6 is a circuit diagram showing the example of a first switch of FIG. 1.

FIG. 6 is a circuit diagram showing the example of the first switch 21 of FIG. 1. In the specific example of FIG. 6, the first switch 21 is configured to include at least two transistors which operate in a complementary manner. In the specific example of FIG. 6, the first switch 21 includes two n-type MOSFETs 211, 212, and an inverter 213. The source terminal of the n-type MOSFET 211 is applied with a ground voltage, the drain terminal of the n-type MOSFET 211 is connected to the source terminal of the n-type MOSFET 212, and the gate terminal of the n-type MOSFET 211 is connected to the output terminal of the inverter 213. The drain terminal of the n-type MOSFET 212 is connected to the first terminal 27, and receives as an input the analog pulse voltage $V_{POST1}$ output from the second output terminal 46 of the neuron circuit 30. The gate terminal of the n-type MOSFET 212 and the input terminal of the inverter 213 are connected to the control terminal 26, and receives the switching pulse voltage $V_{PRE}$ as an input. The common terminal between the two n-type MOSFETs 211, 212 is connected to the second terminal 28. Instead of using the inverter 213, one of two n-type MOSFETs 211, 212, i.e., the n-type MOSFET 211 may be a p-type MOSFET.

In this configuration, for a period during which the switching pulse voltage $V_{PRE}$ applied to the control terminal 26 is HIGH level, the two n-type MOSFETs 211, 212 are in an open state (disconnected state) and a closed state (connected state), respectively, so that the voltage value corresponding to the voltage value of the analog pulse voltage $V_{POST1}$ becomes the output voltage at the second terminal 28. On the other hand, for a period during which the switching pulse voltage $V_{PRE}$ applied to the control terminal 26 is LOW level, the two n-type MOSFETs 211, 212 are in a closed state (connected state) and an open state (disconnected state), respectively, so that the output voltage of the second terminal 28 remains 0V (substantially equal in electric potential to the ground voltage applied to the source terminal of the n-type MOSFET 211).

The second switch 22 includes a first terminal 16 connected to the DC voltage source 23, a second terminal 17 connected to the first terminal 13 of the variable resistance element 10, and a control terminal 18 which is connected to the input terminal 41 of the synapse circuit 20 and performs switching of connection or disconnection between the first terminal 16 and the second terminal 17. The second switch 22 can be realized by, for example, a field effect transistor (FET), etc. In this case, the gate terminal of the FET serves as the control terminal 18.

In the synapse circuit 20 configured as described above, the first input terminal 41 is applied with the switching pulse voltage $V_{POST2}$ output from another neural network circuit element 40, as the first input signal, i.e., the switching pulse voltage $V_{PRE}$, while the second input terminal 42 of the synapse circuit 20 is applied with the analog pulse voltage $V_{POST1}$ output from the neuron circuit 30 within the neural network circuit element 40, including this synapse circuit 20.

What is important in the configuration of the neural network circuit element 40 of the present embodiment is to transmit all of the analog pulse voltages within the neural network circuit element 40 in which these analog pulse voltages are generated such that the analog pulse voltages are not transmitted to another neural network circuit element 40. This makes it possible to properly perform the learning operation using the pulse timings even when the neuron circuits 30 are large in number.

Hereinafter, the operation of the neural network circuit element 40 will be described in more detail.

Firstly, the processing operation of the neural network circuit element 40 will be described. During the "processing" operation, connection of the neural network circuit element 40 is switched so that the voltage applied to the second terminal 42 of the synapse circuit 20 is equal in electric potential to the ground voltage. When the first switch 21 is in the open state, the third terminal 15 of the variable resistance element 10 is connected to the terminal which is equal in electric potential to a ground voltage (not shown). For this reason, irrespective of the state of the first switch 21, the third terminal 15 of the variable resistance element 10 is not applied with a specified voltage (the variable resistance element 10 does not become HIGH level). Therefore, the resistance value of the variable resistance element 10 does not change. In other words, the learning operation does not occur.

During the processing operation, for a period during which the switching pulse voltage $V_{PRE}$ as the first input signal is input to the synapse circuit 20, the second switch 22 connects the DC voltage source 23 to the first terminal 13 of the variable resistance element 10. Specifically, when the switching pulse voltage $V_{PRE}$ is input from another neural network circuit element 40 to the synapse circuit 20, the second switch 22 is opened or closed according to the value of the switching pulse voltage $V_{PRE}$. For example, for a period of the HIGH level when the switching pulse voltage $V_{PRE}$ is equal to or higher than the specified voltage, the second switch 22 is in the closed state (connected state), while for a period which is other than the HIGH level, the second switch 22 is in the open state (disconnected state). Also, the second terminal 14 of the synapse circuit 20 is equal in electric potential to a second specified reference voltage (e.g., ground voltage) which is different from the first reference voltage $V_{DD}$ of the DC voltage source 23.

When the second switch 22 is in the closed state, the DC voltage source 23 and the first terminal 13 of the variable resistance element 10 are connected to each other. As described above, the variable resistance element 10 has a characteristic in which the resistance value between the first terminal 13 and the second terminal 14 is changeable. In the state in which the second switch 22 is in the closed state, the first reference voltage $V_{DD}$ is applied between the first terminal 13 and the second terminal 14 of the variable resistance element 10. Thereby, a current which is proportional to the conductance (inverse value of the resistance value) of the variable resistance element 10 at a present time point is supplied from the DC voltage source 23 to the variable resistance element 10. This current is input to the neuron circuit 30. The magnitude of the current input to the neuron circuit 30 is proportional to the synaptic weight w of the synapse circuit 20, and corresponds to PSP ($P_1(t)$, $P_2(t)$) as shown in FIG. 22. In the present embodiment, the conductance (inverse number of resistance value) of the variable resistance element 10 corresponds to the synaptic weight w.

Currents input from a plurality of synapse circuits 20 to the neuron circuit 30 are asynchronously supplied from other plurality of neural network circuit elements 40 through the corresponding synapse circuits 20. The analog integrating circuit 31 performs temporal-spatial summation of the input currents from the plurality of synapse circuits 20. The integrated voltage generated by the temporal-spatial summation may be deemed as the above stated internal electric potential $V_n$ of the neuron. When the internal electric potential $V_n$ exceeds a predetermined threshold voltage $V_{TH}$, the waveform generating circuit 33 generates the pulse voltages ($V_{POST1}$, $V_{POST2}$). Of the pulse voltages ($V_{POST1}$, $V_{POST2}$), the switching pulse voltage $V_{POST2}$ generated in the waveform generating circuit 33 is applied as the first input signal voltage $V_{PRE}$ to the first input terminal of the synapse circuit 20 of another neural network circuit element 40.

Next, the learning operation, especially, the learning operation utilizing the STDP will be described. During the "learning" operation, as described above, the waveform generating circuit 33 of the neuron circuit 30 generates the analog pulse voltage $V_{POST1}$ at the same timing that the switching pulse voltage $V_{POST2}$ is generated. The analog pulse voltage $V_{POST1}$ is applied to the first terminal 27 of the first switch 21 of the synapse circuit 20. The switching pulse voltage $V_{PRE}$ from another neural network circuit element is input as the first input signal to the control terminal 26 of the first switch 21 of the synapse circuit 20. In the synapse circuit 20, the first switch 21 performs switching in response to the value of the switching pulse voltage $V_{PRE}$. The first switch 21 is configured to connect the first terminal 27 and the second terminal 28 to each other when a voltage which is equal to or higher than a specified voltage is applied to the control terminal 26. The switching pulse voltage $V_{PRE}$ has a waveform with a voltage level which is equal to or higher than the specified voltage level (HIGH level) for a period (permissible input period) with a specified duration. Therefore, for the permissible input period defined based on the switching pulse voltage $V_{PRE}$, the third terminal 15 of the variable resistance element 10 is connected to the second output terminal 46 of the neuron circuit 30 from which the analog pulse voltage $V_{POST1}$ is output, whereas for a period which is other than the permissible input period, the third terminal 15 of the variable resistance element 10 is disconnected from the second output terminal 46.

Next, a description will be given of a method of implementing the STDP in the synapse circuit 20 including the variable resistance element 10 with reference to FIG. 1. For example, it is assumed that for a period during which the switching pulse voltage $V_{PRE}$ is HIGH level, the third terminal 15 of the variable resistance element 10 is connected to the second input terminal 42 of the synapse circuit 20 via the first switch 21. For a period during which the switching pulse voltage $V_{PRE}$ is HIGH level, the first switch 21 is in the closed state, and thereby the second input terminal 42 of the synapse circuit 20 and the third terminal 15 of the variable resistance element 10 are placed in a continuity state. In this way, the permissible input period starts, during which the analog pulse voltage $V_{POST1}$ is permitted to be input as the second input signal voltage to the third terminal 15 of the variable resistance element 10. For the permissible input period, a portion of the analog pulse voltage $V_{POST1}$ input to the second input terminal 42 is applied to the third terminal 15 of the variable resistance element 10. Thus, the pulse voltage which temporally overlaps with the switching pulse voltage $V_{PRE}$ (has a specified duration), of the analog pulse voltage $V_{POST1}$, is applied to the third terminal 15 of the variable resistance element 10. By this pulse voltage with a specified duration, the resistance value of the variable resistance element 10 is changed. As described above, in the present embodiment, the inverse number of resistance value (conductance) of the variable resistance element 10 corresponds to the synaptic weight. Therefore, it becomes possible to perform the "learning" operation for updating the strength of the synaptic weight of the synapse circuit 20 according to the change in the resistance value.

Depending on the timings at which the analog pulse voltage $V_{POST1}$ and the switching pulse voltage $V_{PRE}$ are applied, the waveform of the pulse voltage applied to the third terminal 15 of the variable resistance element 10 changes. As described above, the degree to which the resistance value of the variable resistance element 10 changes depends on the magnitude of the voltage applied thereto, i.e., voltage waveform. Depending on the timings when the two pulse voltages are applied, the waveform of the pulse voltages applied to the third terminal 15 of the variable resistance element 10 changes. Therefore, the degree to which the resistance value of the variable resistance element 10 changes, also varies depending on the timings at which the two pulse voltages are applied. By using the bipolar sawtooth pulse voltage of FIG. 4A as the analog pulse voltage $V_{POST1}$, the non-symmetric STDP of FIG. 23B can be implemented. Also, by using the mexican-hat pulse voltage of FIG. 4B as the analog pulse voltage $V_{POST1}$, the symmetric STDP of FIG. 23C can be implemented.

Figure 7:
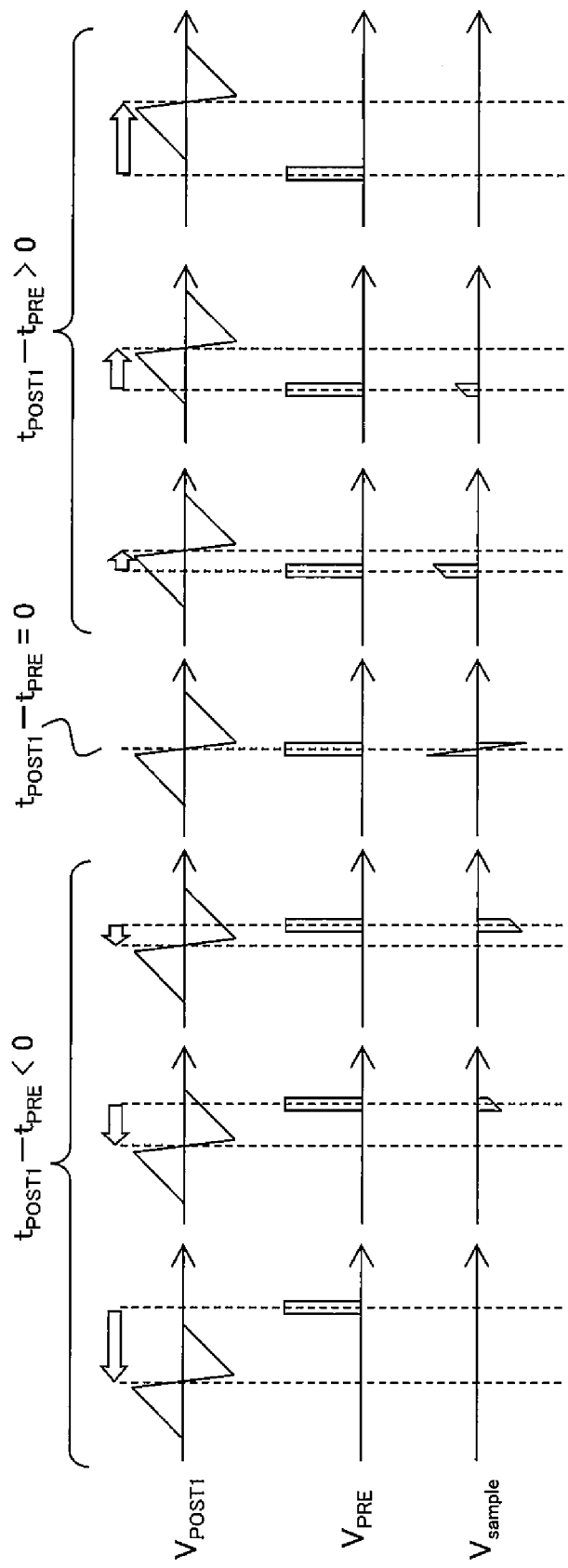
FIG. 7 is a timing chart of pulse voltages in a case where a bipolar sawtooth pulse voltage of FIG. 4A is used as the analog pulse voltage, and a square wave pulse voltage of FIG. 4C is used as the switching pulse voltage.

FIG. 7 schematically shows the timing chart of the pulse voltages in a case where the bipolar sawtooth pulse voltage of FIG. 4A is used as the analog pulse voltage $V_{POST1}$ and the square wave pulse voltage of FIG. 4C is used as the switching pulse voltage $V_{PRE}$. Regarding the example of FIG. 7, also, it is assumed that only for a period during which the switching pulse voltage $V_{PRE}$ is HIGH level, the analog pulse voltage $V_{POST1}$ is applied to the third terminal 15 of the variable resistance element 10 as described above. In the example of FIG. 7, the voltage (hereinafter will be referred to as gate input voltage) applied to the third terminal 15 for the permissible input period by the operation of the first switch 21 is expressed as $V_{sample}$. An input timing difference ($t_{POST1}-t_{PRE}$) between the analog pulse voltage $V_{POST1}$ and the switching pulse voltage $V_{PRE}$ is a time difference between reference points which are the temporal mid points (time $t_0$ in FIGS. 4A and 4C) of the two pulse voltages. FIG. 7 shows the magnitude of the input timing difference between the two pulse voltages, by arrows.

As shown in FIG. 7, as the input timing difference ($t_{POST1}-t_{PRE}$) between the analog pulse voltage $V_{POST1}$ and the switching pulse voltage $V_{PRE}$ changes, the waveform of the gate input voltage $V_{sample}$ changes, too. For example, when the analog pulse voltage $V_{POST1}$ and the switching pulse voltage $V_{PRE}$ temporally overlap with each other, in a case where the input timing difference ($t_{POST1}-t_{PRE}$)<0 (the analog pulse voltage $V_{POST1}$ is input earlier than the switching pulse voltage $V_{PRE}$), the gate input voltage $V_{sample}$ becomes a negative voltage. Until the input timing difference decreases to some degree, the magnitude of the gate input voltage $V_{sample}$ increases as the input timing difference decreases. As the magnitude of the gate input voltage $V_{sample}$ increases in a negative direction, the conductance (inverse number of resistance value) of the variable resistance element 10 decreases greatly. On the other hand, when the analog pulse voltage $V_{POST1}$ and the switching pulse voltage $V_{PRE}$ temporally overlap with each other, in a case where the input timing difference ($t_{POST1}-t_{PRE}$)>0 (the analog pulse voltage $V_{POST1}$ is input later than the switching pulse voltage $V_{PRE}$), the gate input voltage $V_{sample}$ becomes a positive voltage. Until the input timing difference decreases to some degree, the magnitude of the gate input voltage $V_{sample}$ increases as the input timing difference decreases. As the magnitude of the gate input voltage $V_{sample}$ increases in a positive direction, the conductance (inverse number of resistance value) of the variable resistance element 10 increases greatly. In a specified range in which the input timing difference ($t_{POST1}-t_{PRE}$) is close to 0, the average value of the gate input voltage $V_{sample}$ is close to approximately 0.

Figure 8:
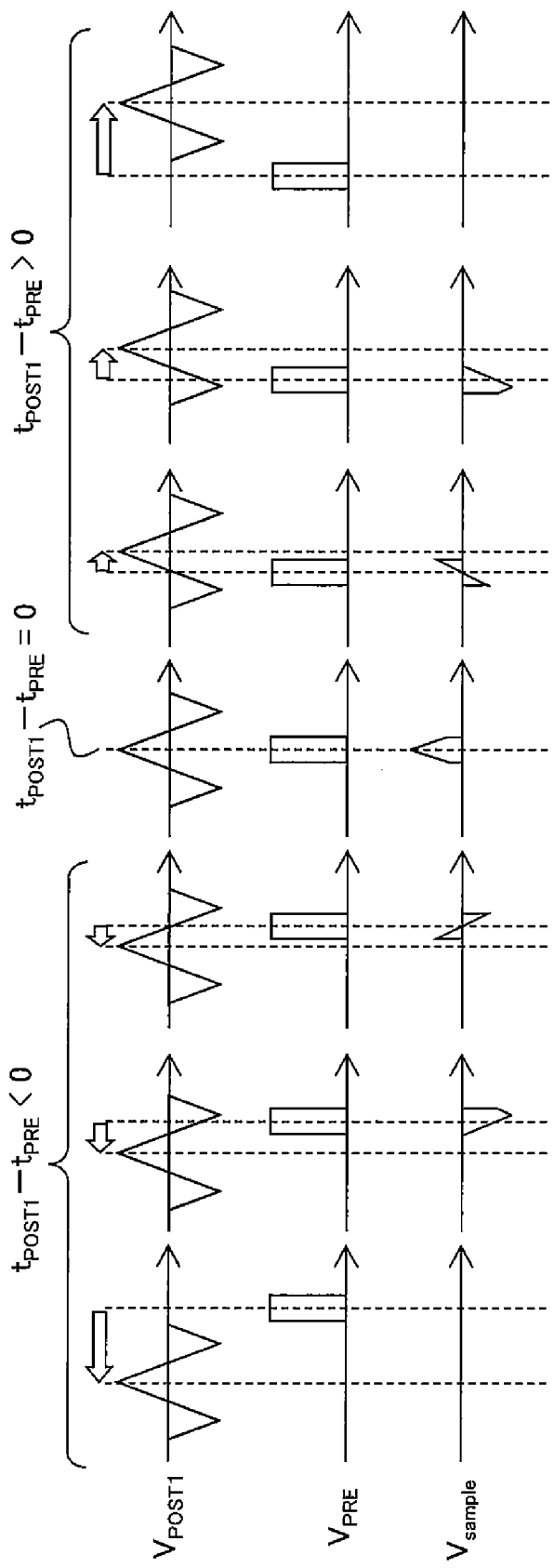
FIG. 8 is a timing chart of pulse voltages in a case where a mexican-hat pulse voltage of FIG. 4B is used as the analog pulse voltage, and the square wave pulse voltage of FIG. 4C is used as the switching pulse voltage.

As described above, instead of the bipolar sawtooth pulse voltage, the mexican-hat pulse voltage may be used as the analog pulse voltage $V_{POST1}$. FIG. 8 is the timing chart of the pulse voltages in a case where the mexican-hat pulse voltage of FIG. 4B is used as the analog pulse voltage $V_{POST1}$ and the square wave pulse voltage of FIG. 4C is used as the switching pulse voltage $V_{PRE}$. Also, it is assumed that only for a period during which the switching pulse voltage $V_{PRE}$ is HIGH level, the analog pulse voltage $V_{POST1}$ is applied to the third terminal 15 of the variable resistance element 10.

As shown in FIG. 8, in the case where the mexican-hat pulse voltage is used as the analog pulse voltage $V_{POST1}$, as the input timing difference ($t_{POST1}-t_{PRE}$) between the analog pulse voltage $V_{POST1}$ and the switching pulse voltage $V_{PRE}$ changes, the waveform of the gate input voltage $V_{sample}$ changes, too. For example, when the analog pulse voltage $V_{POST1}$ takes a positive value at the timing when the switching pulse voltage $V_{PRE}$ is applied, the gate input voltage $V_{sample}$ becomes a positive voltage. As the input timing difference decreases, the magnitude of the gate input voltage difference $V_{sample}$ increases. As the magnitude of the gate input voltage $V_{sample}$ increases in a positive direction, the conductance (inverse number of resistance value) of the variable resistance element 10 increases greatly. On the other hand, when the analog pulse voltage $V_{POST1}$ takes a negative value at the timing when the switching pulse voltage $V_{PRE}$ is applied, the gate input voltage $V_{sample}$ becomes a negative voltage. As the magnitude of the gate input voltage $V_{sample}$ increases in a negative direction, the conductance (inverse number of resistance value) of the variable resistance element 10 decreases greatly.

As described above, in the example of FIG. 7 and the example of FIG. 8, by switching the first switch 21 using the switching pulse voltage $V_{PRE}$, the gate input voltage $V_{sample}$ which depends on the input timing difference, is applied to the third terminal 15 of the variable resistance element 10, based on the input timing difference between the analog pulse voltage (second input signal voltage) $V_{POST1}$ generated in the neural network circuit element 40 including this first switch 21 and the switching pulse voltage (first input signal voltage) $V_{PRE}$ input from another neural network circuit element 40. Because of the gate input voltage $V_{sample}$ applied in this way, the change in the resistance value which depends on the input timing difference in the variable resistance element 10, i.e., learning based on the STDP, is implemented.

As described above, in accordance with the above configuration, the pulse voltage $V_{POST2}$ for the switching, of the analog pulse voltage $V_{POST1}$ such as the bipolar sawtooth pulse voltage or the mexican-hat pulse voltage, and the pulse voltage $V_{POST2}$ for switching, with a specified duration, which pulse voltages are generated in a particular neural network circuit element 40, is transmitted as the first input signal voltage $V_{PRE}$ to another neural network circuit element 40, while the analog pulse voltage $V_{POST1}$ is used in the neural network circuit element 40 which generates this analog pulse voltage $V_{POST1}$. The switching pulse voltage $V_{POST2}$ ($V_{PRE}$) transmitted between the plurality of neural network circuit elements 40 is used for only the switching of the connection state of the first switch 21. Therefore, it is sufficient that the switching pulse voltage $V_{PRE}$ has an accuracy which allows the binary value to be identified. The switching pulse voltage $V_{PRE}$ is less susceptible to a noise.

Therefore, between the plurality of neural network circuit elements 40, only the pulse voltage for switching which is less susceptible to a noise, is transmitted. This eliminates a need to transmit the analog pulse voltage $V_{POST1}$ between the plurality of neural network circuit elements 40. Therefore, even when the neurons are large in number, the learning operation using the pulse timings can be performed properly. In addition, since measures for lessening the effects of the noise in the transmission of the analog signal may be omitted, the neural network circuit elements 40 which are larger in number can be incorporated into the neural network circuit, without increasing the circuit area of the neural network circuit.

To define the input timings of the signals transmitted from other neural network circuit elements 40, a delay circuit (not shown) may be connected to the output terminal 52 of the neural network circuit element 40. In the configuration disclosed in non-patent literature 1, there exist two kinds of signals output from one neural network circuit element. Therefore, two delay circuits are necessary. In contrast, in the neural network circuit 1 of the present embodiment, the signal output from one neural network circuit element 40 is only the switching pulse voltage $V_{POST2}(V_{PRE})$, and hence one delay circuit is sufficient. This makes it possible to reduce the chip area per neural network circuit element including the delay circuit.

As shown FIG. 2, a plurality of neural network circuit elements 40 are mounted on a plurality of chips (semiconductor chips) 2. In this case, the plurality of semiconductor chips 2 are configured in such a manner that the output terminal 52 (i.e., first output terminal 45 of neuron circuit 30) of at least one neural network circuit element 40 mounted on one semiconductor chip 2 is connected to the input terminal 51 (i.e., input terminal 41 of synapse circuit 20) of at least one neural network circuit element 40 mounted on another semiconductor chip 2. The output terminal 52 of a particular neural network circuit element 40 mounted on one semiconductor chip 2 is connected to the input terminal 51 of another neural network circuit element 40 mounted on another semiconductor chip 2, via a wiring member 3 such as a board wire.

The wiring member 3 is larger in resistive component or capacitive component than a minute wire within the semiconductor chip 2. This cause an increase in the effects of attenuation or strain of signals as compared to the signal transmission within the semiconductor chip 2. However, in the neural network circuit 1 of the present embodiment, the signal transmitted via the wiring member 3 between the plurality of semiconductor chips 2 is only the pulse voltage $V_{PRE}$ for switching, which is less susceptible to a noise, as described above. Therefore, even when many neural network circuit elements 40 constituting the neural network circuit 1 are mounted over the plurality of semiconductor chips 2, the signal transmission between the semiconductor chips 2 is less affected by the noise. Therefore, even when the neural network circuit elements 40 which can be mounted on one semiconductor chip 2 are limited in number, it becomes possible to realize the neural network circuit 1 which can incorporate more neural network circuit elements 40 without a limitation in number and perform a proper learning operation. For example, assuming that about 1000 neural network circuit elements 40 can be mounted on the semiconductor chip 2 of (1 cm×1 cm), the neural network circuit 1 incorporating 10000 neural network circuit elements 40 can be easily realized, by connecting 10 semiconductor chips 2.

Figure 9A:
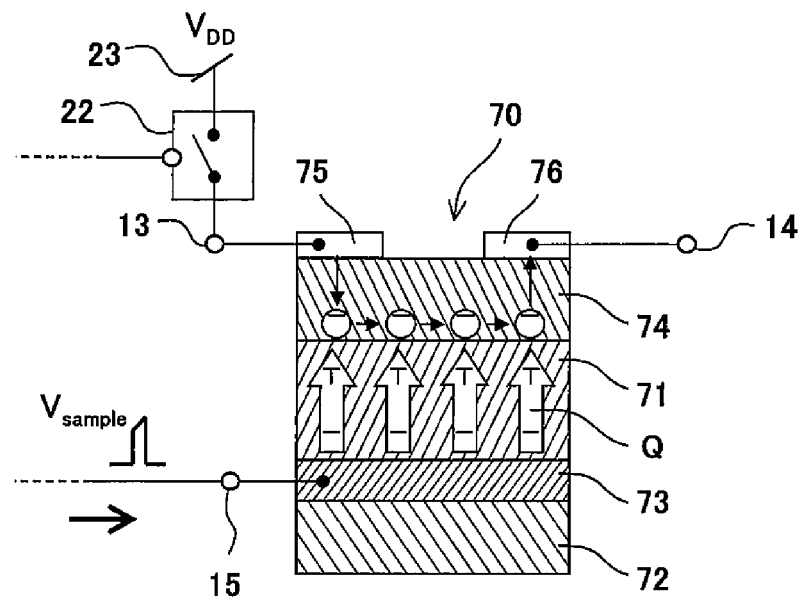
FIG. 9A is a cross-sectional view showing the exemplary schematic configuration of a variable resistance element of the neural network circuit element of FIG. 1.
Figure 9B:
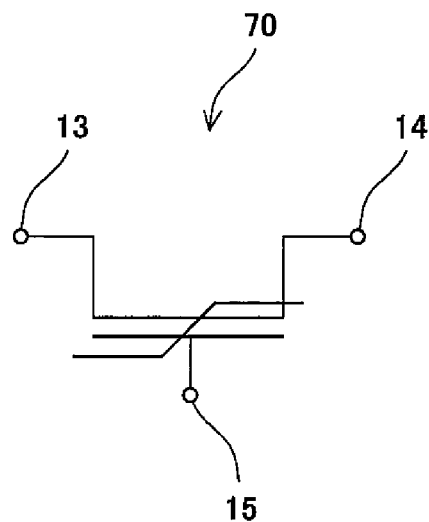
FIG. 9B is a view showing the circuit symbol of the variable resistance element of FIG. 9A.

Hereinafter, the example of the variable resistance element 10 of the present embodiment will be described. FIG. 9A is a cross-sectional view showing the exemplary schematic configuration of the variable resistance element 10 of the neural network circuit element 40 of FIG. 1. FIG. 9B is a view showing the circuit symbol of the variable resistance element 10 of FIG. 9A. The variable resistance element 10 of FIG. 9A is the ferroelectric memristor (hereinafter ferroelectric memristor will be designated by reference symbol 70).

As shown in FIG. 9A, the ferroelectric memristor 70 has a field effect transistor structure in which a ferroelectric layer 71 is a gate insulating layer. The ferroelectric memristor 70 includes a gate electrode (control electrode) 73 provided on a substrate 72, the ferroelectric layer 71 provided such that the gate electrode 73 is in contact with the ferroelectric layer 71, a semiconductor layer 74 provided on the ferroelectric layer 71, and a source electrode 75 and a drain electrode 76 (first electrode and second electrode) which are provided on the semiconductor layer 74. The source electrode 75, the drain electrode 76 and the gate electrode 73 of the ferroelectric memristor 70 correspond to the first terminal 13, the second terminal 14 and the third terminal 15 of the variable resistance element 10, respectively.

The semiconductor layer 74 is made of, for example, ZnO, GaN, InGaZnO, etc. The ferroelectric layer 71 is made of, for example, $Pb(Zr, Ti)O_3$, $Sr(Bi, Ta)O$, $Bi_{12}TiO_{20}$, etc. The source electrode 75, the drain electrode 76 and the gate electrode 73 comprise, for example, a laminate or the like, including a platinum layer and a titanium layer.

In the ferroelectric memristor 70 configured as described above, when a voltage is applied between the gate electrode 73, and the source electrode 75 and/or the drain electrode 76, the resistance value between the source electrode 75 and the drain electrode 76 changes in a non-volatile manner, depending on the polarization direction (indicated by arrows Q in FIG. 9A) of the ferroelectric layer 71.

This will be described more specifically. Hereinafter, it is supposed that the direction from the gate electrode 73 toward the semiconductor layer 74 is an upward direction, and the direction from the semiconductor layer 74 toward the gate electrode 73 is a downward direction. As shown in FIG. 9A, in the case where a portion of the ferroelectric layer 71 has upward polarization (polarization indicated by arrows Q in FIG. 9A), the semiconductor layer 74 stacked above the polarized portion of the ferroelectric layer 71 has a small resistance value. In contrast, in the case where a portion of the ferroelectric layer 71 has downward polarization (polarization in a direction opposite to the direction indicated by arrows Q in FIG. 9A), the semiconductor layer 74 stacked above the polarized portion of the ferroelectric layer 71 has a large resistance value. The resistance value between the source electrode 75 and the drain electrode 76 is the resistance value in a region of the semiconductor layer 74 which is sandwiched between the source electrode 75 and the drain electrode 76. Therefore, depending on the ratio of the polarization of the ferroelectric layer 71 which is located below the region of the semiconductor layer 74, the resistance value between the source electrode 75 and the drain electrode 76 changes continuously.

By changing the electric potential difference between the source electrode 75 and/or the drain electrode 76 and the gate electrode 73 in order to control the resistance value between the source electrode 75 and the drain electrode 76 in the ferroelectric memristor 70 configured as described above, the polarization direction of the ferroelectric layer 71 is changed. For example, when a positive voltage is applied to the gate electrode 73 on the basis of the source electrode 75 and/or the drain electrode 76, the direction of the electric field caused by the polarization of the ferroelectric layer 71 is easily made upward (toward the semiconductive layer 74). On the other hand, when a negative voltage is applied to the gate electrode 73 on the basis of the source electrode 75 and/or the drain electrode 76, the direction of the electric field caused by the polarization of the ferroelectric layer 71 is easily made downward (toward the gate electrode 73). As the magnitude (absolute value) of the applied voltage increases, a change amount of the polarization of the ferroelectric layer 71 increases. Therefore, when the positive voltage is applied to the gate electrode 73, the resistance value between the source electrode 75 and the drain electrode 76 decreases, while when the negative voltage is applied to the gate electrode 73, the resistance value between the source electrode 75 and the drain electrode 76 increases. The resistance value between the electrodes 75 and 76 changes more greatly as the absolute value of the voltage applied to the gate electrode 73 increases. As described above, the ferroelectric memristor 70 may operate similarly to the above variable resistance element 10.

Now, the manufacturing method of the above ferroelectric memristor 70 will be described. Initially, an oxide conductive layer comprising a strontium ruthenium oxide(SrRuO$_3$) is deposited on a (001) single crystal substrate 72 comprising, for example, a strontium titanate (SrTiO$_3$), by pulse laser deposition (hereinafter will be referred to as PLD). The thickness of the oxide conductive layer is, for example, 30 nm. The temperature of the substrate 72 during deposition is 700 degrees C. After the deposition of the oxide conductive layer, the gate electrode 73 is formed by photolithography and ion trimming.

Then, in a state in which the temperature of the substrate 72 is 700 degrees C., the ferroelectric layer 702 comprising lead zirconate titanate (Pb(Zr, Ti)O$_3$) is deposited on the gate electrode 73 by the PLD. The thickness of lead zirconate titanate is, for example, 450 nm After that, the temperature of the substrate 72 is lowered to 400 degrees C. In this state, the semiconductive layer 74 comprising zinc oxide (ZnO) is deposited on the ferroelectric layer 702. The thickness of the semiconductor layer 74 is, for example, 450 nm.

A patterned resist is deposited on the semiconductive layer 74. Then, the titanium layer and the platinum layer are deposited by electronic beam evaporation under a room temperature, thereby fabricating the laminate comprising the titanium layer and the platinum layer. The thickness of the titanium layer is, for example, 5 nm, while thickness of the platinum layer is, for example, 30 nm. After the deposition of the laminate, the source electrode 75 and the drain electrode 76 are formed by lift-off. In this way, the ferroelectric memristor 70 is fabricated.

[Evaluation of Synapse Circuit Associated with Non-Symmetric STDP]

Figure 10:
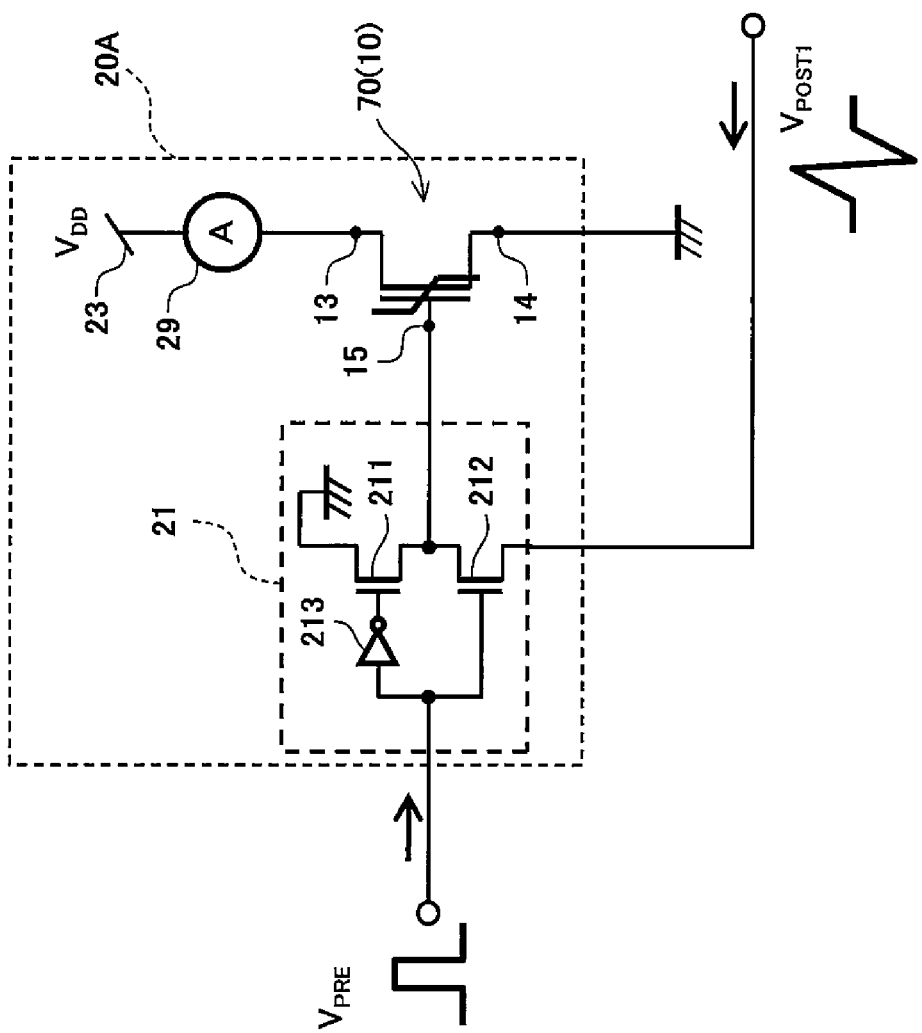
FIG. 10 is a block diagram showing the exemplary configuration of a verification synapse circuit incorporating a ferroelectric memristor.

A synapse circuit for verification (verification circuit) is configured using the ferroelectric memristor 70 fabricated as described above, and it is verified whether or not the switching operation of FIG. 7 can be implemented. The result of the verification is as follows. FIG. 10 is a block diagram showing the exemplary configuration of a verification synapse circuit 20A incorporating the ferroelectric memristor 70. The verification synapse circuit 20A of FIG. 10 is configured to include the ferroelectric memristor 70 of FIG. 9A, as the variable resistance element 10 (in FIG. 10, the ferroelectric memristor 70 is indicated by the circuit symbol of FIG. 9B). In the verification synapse circuit 20A, the constituents which are other than those used to verify the switching operation are omitted from the synapse circuit 20 of FIG. 1. Specifically, in the verification synapse circuit 20A, the second switch 22 of FIG. 1 is omitted. Therefore, the DC voltage source 23 is connected to the first terminal 13 of the ferroelectric memristor 70 via the current meter 29. The output terminal 43 of the verification synapse circuit 20A is electrically grounded. As the first switch 21, the circuit of FIG. 6 is used. The first reference voltage $V_{DD}$ of the DC voltage source 23 is, for example, 0.1V.

As described above, the first switch 21 operates so that the analog pulse voltage $V_{POST1}$ is applied to the gate electrode 73 of the ferroelectric memristor 70 only for a period during which the switching pulse voltage $V_{PRE}$ is HIGH level (permissible input period), and the gate electrode 73 of the ferroelectric memristor 70 is grounded for a period other than the permissible input period.

In the present verification, the bipolar sawtooth pulse voltage of FIG. 4A, having the non-symmetric waveform is used as the analog pulse voltage $V_{POST1}$, and the square wave pulse voltage of FIG. 4C, having the waveform is used as the switching pulse voltage $V_{PRE}$. The cycle of the analog pulse voltage $V_{POST1}$, used in the present verification, is 40 µs (period from a certain time point of voltage 0 to a next time point of voltage 0 is 20 µs), and the maximum value of a magnitude of a positive voltage and the maximum value of a magnitude of a negative voltage are each 1.5V. The duration of the switching pulse voltage $V_{PRE}$, used in the present verification, is 5 µs, and the maximum value of a magnitude of a positive voltage and the maximum value of a magnitude of a negative voltage are each 2V. While changing the timing of application of the analog pulse voltage $V_{POST1}$, and the timing of application of the switching pulse voltage $V_{PRE}$, by using these pulses, the conductance (current value measured by the current meter 29) before and after the application of the pulse voltages is measured.

Figure 11:
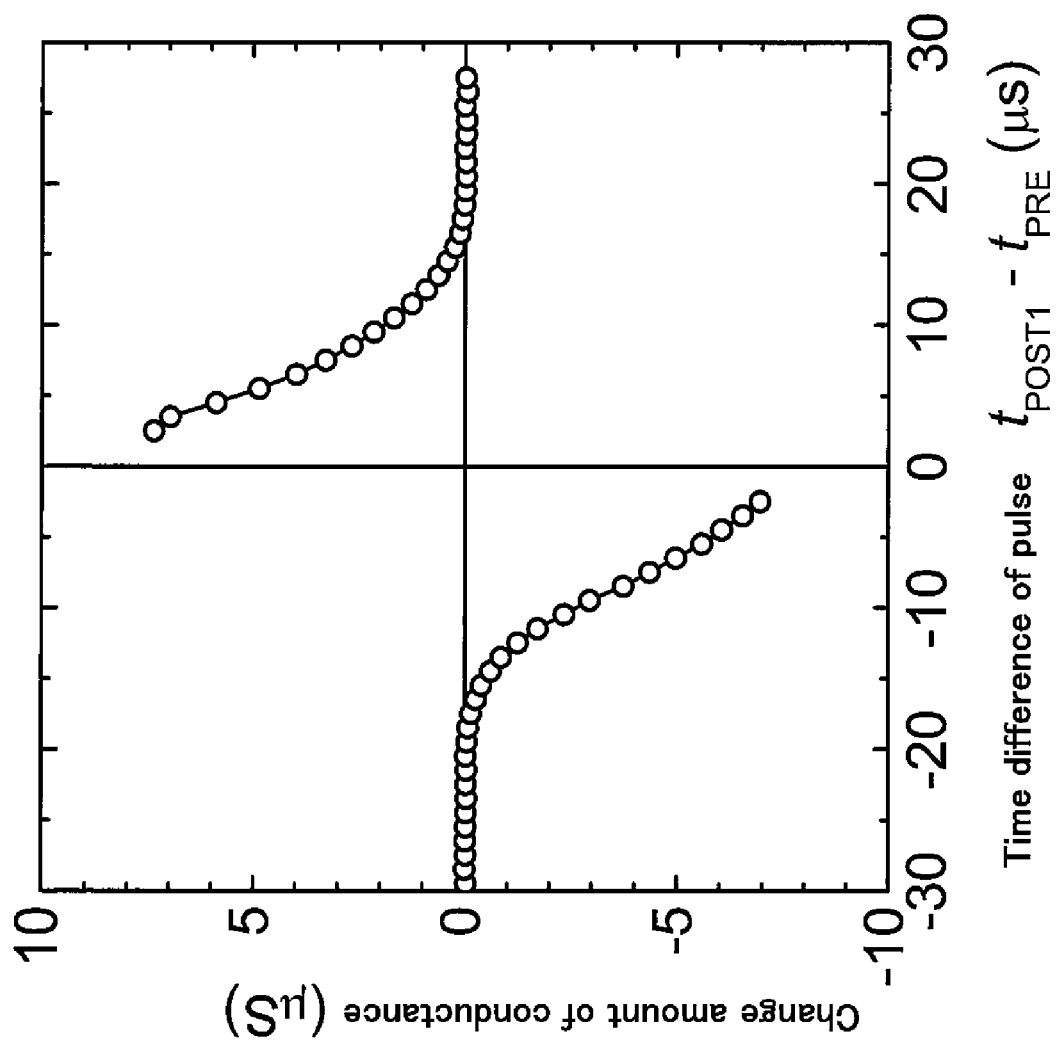
FIG. 11 is a graph showing the result of verification of the synapse circuit, which is associated with a non-symmetric STDP.

FIG. 11 is a graph showing the result of verification of the synapse circuit, which is associated with the non-symmetric STDP. FIG. 11 shows the change amount of the conductance of the ferroelectric memristor 70 with respect to a time difference between the two pulses obtained from the verification synapse circuit 20A of FIG. 10. As shown in FIG. 11, the waveform having the non-symmetric STDP characteristic of FIG. 23B is obtained. Therefore, by using the ferroelectric memristor 70 as the variable resistance element 10, the learning operation based on the STDP can be implemented appropriately based on the timing difference between the pulses.

(Evaluation of Integral Action Associated with Non-Symmetric STDP)

Figure 12:
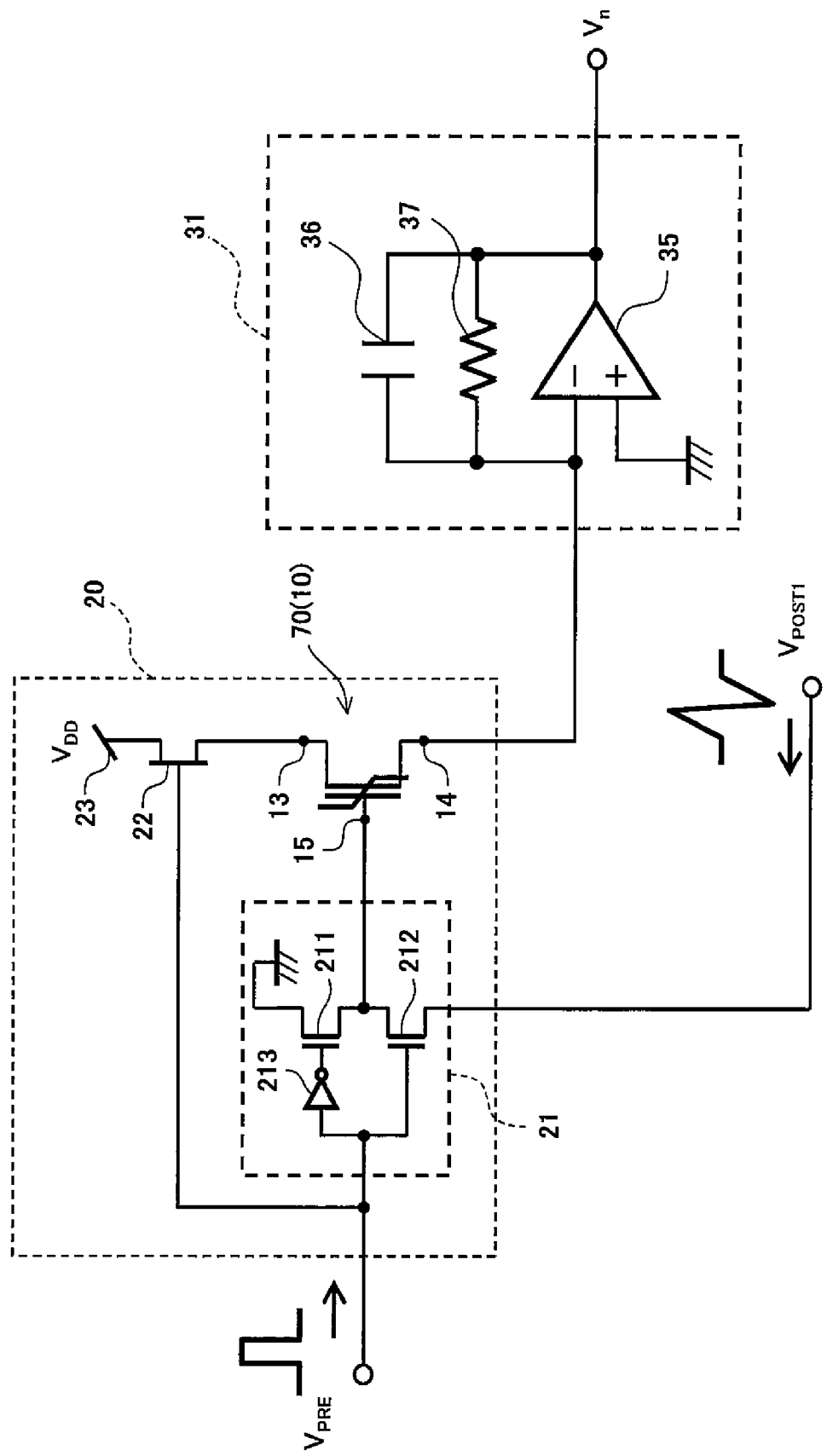
FIG. 12 is block diagram showing a portion of the neural network circuit element including the ferroelectric memristor.

Next, a description will be given of evaluation as to whether or not the voltage output from the analog integrating circuit 31 may be deemed as the internal electric potential $V_n$ of the neuron, in a case where the current output from the ferroelectric memristor 70 is input to the analog integrating circuit 31. The result will be described below. FIG. 12 is block diagram showing a portion of the neural network circuit element 40 including the ferroelectric memristor 70. In the circuit of FIG. 12, the ferroelectric memristor 70 of FIG. 9A is used as the variable resistance element 10, and the circuit of FIG. 6 is used as the first switch 21. The circuit of FIG. 3 is used as the analog integrating circuit 31. As the second switch 22, a field effect transistor is used. That is, the switching pulse voltage $V_{PRE}$ is applied to the gate terminal of the field effect transistor. The field effect transistor of the circuit of FIG. 12 is ON to connect the DC voltage source 23 to the first terminal 13 of the ferroelectric memristor 70 when the switching pulse voltage $V_{PRE}$ is HIGH level and is OFF to disconnect the DC voltage source 23 from the first terminal 13 of the ferroelectric memristor 70 when the switching pulse voltage $V_{PRE}$ is not HIGH level. The ON-resistance value of the field effect transistor 24 is equal to or less than 1/100 of the resistance value of the ferroelectric memristor 70. From this, it may be said that the resistance value between the DC voltage source 23 and the negative input terminal (−) of the operational amplifier 35 of the analog integrating circuit 31 is substantially equal to the resistance value of the ferroelectric memristor 70. Therefore, for a period during which the switching pulse voltage $V_{PRE}$ is HIGH level, a pulse current flows through the ferroelectric memristor 70. The magnitude of the pulse current is proportional to the inverse number of resistance value (conductance) of the ferroelectric memristor 70.

The pulse current input to the analog integrating circuit 31 charges the capacitor 36 of the analog integrating circuit 31.

Because of this, the voltage derived by temporal integration is output as $V_n$. Now, evaluation will be made for the integrated voltage $V_n$ at a time point when 20 µs passes after the switching pulse voltage $V_{PRE}$ is applied to the ferroelectric memristor 70.

In the present verification, also, as the analog pulse voltage $V_{POST1}$ and the switching pulse voltage $V_{PRE}$, the same waveforms as those used in the verification using the verification synapse circuit 20A are used. While changing the timing of application of the analog pulse voltage $V_{POST1}$, and the timing of application of the switching pulse voltage $V_{PRE}$, by using these waveforms, the integrated voltage $V_n$ before and after the application of the pulse voltages is measured.

Figure 13:
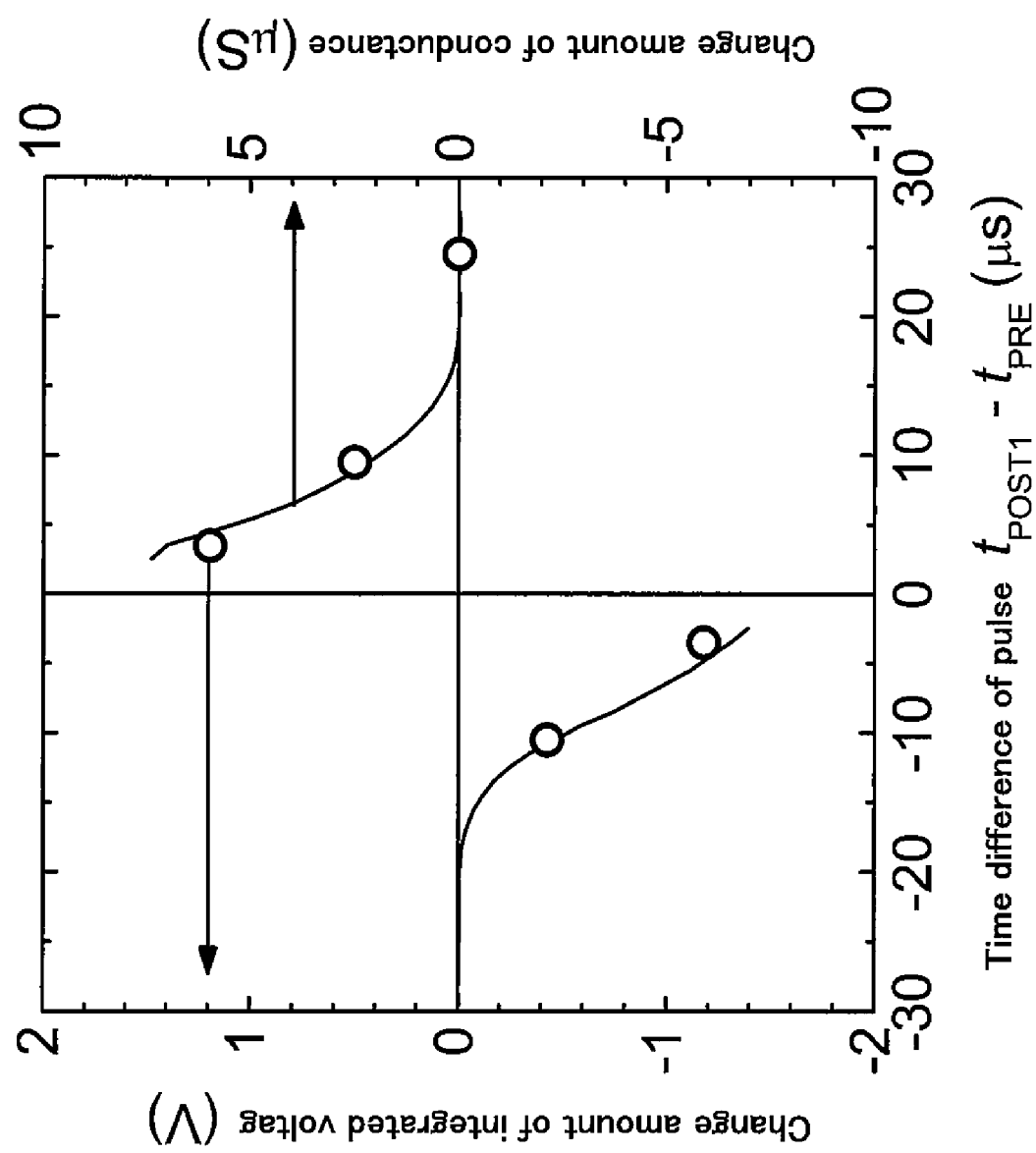
FIG. 13 is a graph showing the result of verification of the integral action, which is associated with the non-symmetric STDP.

FIG. 13 is a graph showing the result of verification of the integral action, which is associated with the non-symmetric STDP. FIG. 13 shows the change amount of the integrated voltage $V_n$, with respect to a time difference between the two pulses obtained from the analog integrating circuit 31 of FIG. 12. In FIG. 13, white circle dots indicate the integrated voltage $V_n$. The scale of the integrated voltage $V_n$ is indicated on a left axis. For reference, FIG. 13 shows that the change amount of the conductance of FIG. 11 is indicated by solid lines on the same graph. The scale of the conductance is indicated on a right axis. As shown in FIG. 13, the change amount of the integrated voltage $V_n$ indicates the characteristic corresponding to the change amount of the conductance, and it can be understood that the STDP characteristic of the ferroelectric memristor 70 is reflected on the integral action of the analog integrating circuit 31. Therefore, it may be appreciated that the integrated voltage $V_n$ output from the analog integrating circuit 31 can be deemed as the internal electric potential of the neuron.

(Evaluation of Synapse Circuit Associated with Symmetric STDP)

As in the above verification, the verification is performed using the mexican-hat pulse voltage of FIG. 4B, having the symmetric waveform, is used as the analog pulse voltage $V_{POST1}$, in the verification synapse circuit 20A of FIG. 10. The result of the verification is as follows. The cycle of the analog pulse voltage $V_{POST1}$, used in the present verification, is 30 µs (period from a certain time point of voltage 0 to a next time point of voltage 0 is 10 µs), and the maximum value of a magnitude of a positive voltage and the maximum value of a magnitude of a negative voltage are each 1.5V. The switching pulse voltage $V_{PRE}$ is the same as that of the non-symmetric STDP. While changing the timing of the application of the analog pulse voltage $V_{POST1}$, and the timing of the application of the switching pulse voltage $V_{PRE}$, the conductance (current value measured by the current meter 29) before and after the application of the pulse voltages is measured.

Figure 14:
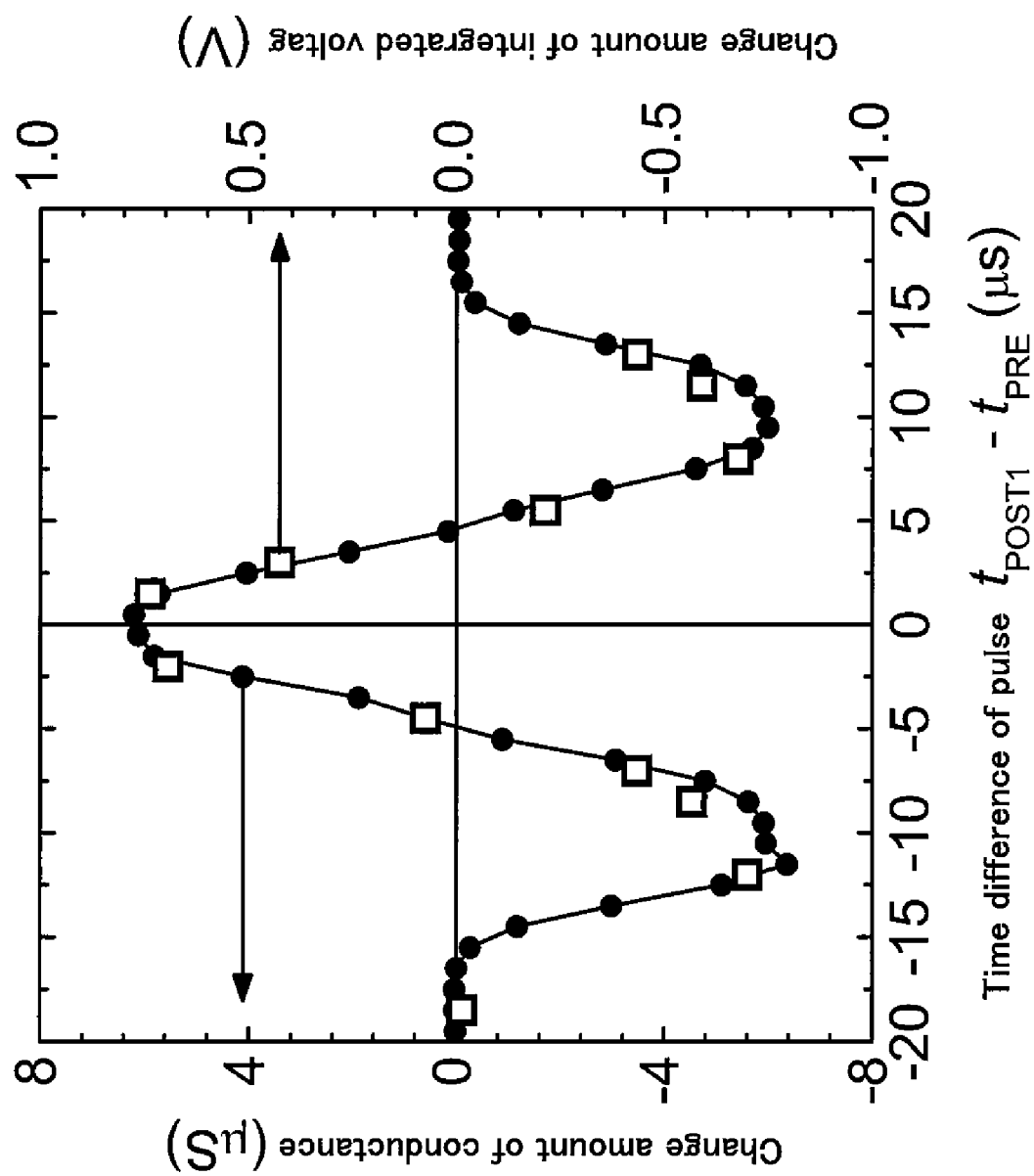
FIG. 14 is a graph showing the result of verification of the synapse circuit and the integral action, which is associated with the symmetric STDP.

FIG. 14 is a graph showing the result of verification of the synapse circuit and the integral action, which is associated with the symmetric STDP. In FIG. 14, black circuit dots indicate the change amount of the conductance of the ferroelectric memristor 70 with respect to a time difference between the two pulses obtained from the verification synapse circuit 20A of FIG. 10. The scale of the change amount of the conductance is indicated on a left axis. As shown in FIG. 14, the waveform having the symmetric STDP characteristics as shown in FIG. 23C is obtained. Therefore, by using the ferroelectric memristor 70 as the variable resistance element 10, the learning operation based on the STDP can be implemented appropriately based on the timing difference between the pulses.

(Evaluation of Integral Action Associated with Symmetric STDP)

As in the case of the non-symmetric STDP, evaluation is made for the symmetric STDP as to whether or not the voltage output from the analog integrating circuit 31 may be deemed as the internal electric potential $V_n$, in a case where the current output from the ferroelectric memristor 70 is input to the analog integrating circuit 31. The result is as follows. The present verification is performed as in the verification for the non-symmetric STDP, except that the mexican-hat pulse voltage of FIG. 4B having the symmetric waveform is used as the analog pulse voltage $V_{POST1}$. The analog pulse voltage $V_{POST1}$, used in the present verification is the same as that used in the evaluation of the synapse circuit.

FIG. 14 shows the change amount of the integrated voltage $V_n$, with respect to a time difference between the two pulses obtained from the analog integrating circuit 31 of FIG. 12, by white rectangular dots. The scale of the integrated voltage $V_n$ is indicated on a right axis. As shown in FIG. 14, as in the case of the non-symmetric STDP, the change amount of the integrated voltage $V_n$ indicates the characteristic corresponding to the change amount of the conductance, and it can be understood that the STDP characteristic of the ferroelectric memristor 70 is reflected on the integral action of the analog integrating circuit 31. Therefore, it may be appreciated that the integrated voltage $V_n$ output from the analog integrating circuit 31 can be deemed as the internal electric potential of the neuron.

Embodiment 2

Figure 15A:
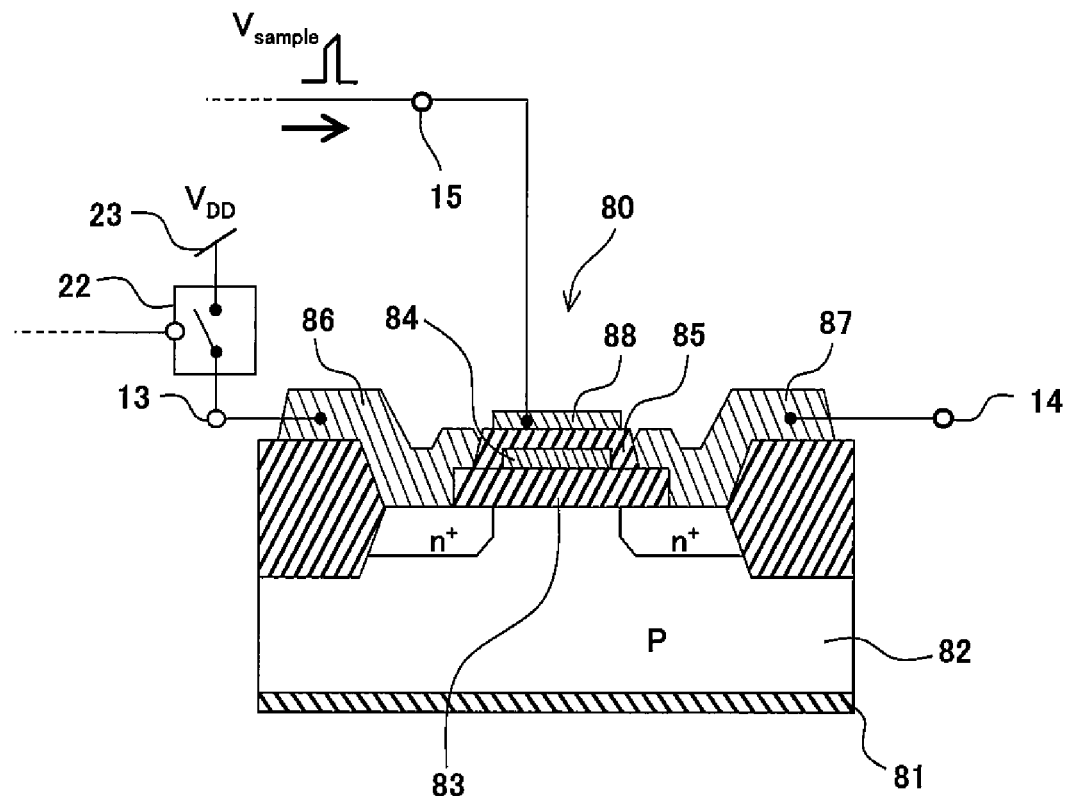
FIG. 15A is a cross-sectional view showing the schematic configuration of a floating gate transistor used as a variable resistance element in a synapse circuit according to Embodiment 2 of the present disclosure.
Figure 15B:
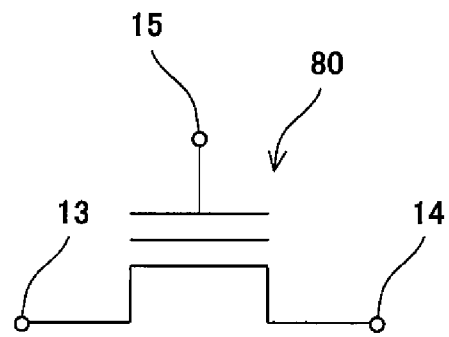
FIG. 15B is a view showing the circuit symbol of the floating gate transistor of FIG. 15A.

Next, Embodiment 2 of the present disclosure will be described. FIG. 15A is a cross-sectional view showing the schematic configuration of a floating gate transistor 80 used as the variable resistance element 10 in the synapse circuit according to Embodiment 2 of the present disclosure. FIG. 15B is a view showing the circuit symbol of the floating gate transistor 80 of FIG. 15A. In the present embodiment, the overall configuration of the neural network circuit is similar to that of FIGS. 1 and 2. The neural network circuit of the present embodiment is different from the neural network circuit of Embodiment 1 in that the floating gate transistor 80 is used as the variable resistance element 10.

As shown in FIG. 15A, the floating gate transistor 80 includes a semiconductor layer 82 provided on a substrate 81, a first dielectric layer 83 provided on a portion of the semiconductor layer 82, a floating gate electrode 84 provided on the first dielectric layer 83, a second dielectric layer 85 provided on the first dielectric layer 83 and the floating gate electrode 84, a drain electrode 825 and a source electrode 826 which are provided on the semiconductor layer 82, and a control gate electrode 88 which is provided on the second dielectric layer 85 and insulated from the floating gate electrode 84 by the second dielectric layer 85. The drain electrode 86, the source electrode 87 and the control gate electrode 88 of the floating gate transistor 80 correspond to the first terminal 13, the second terminal 14 and the third terminal 15 of the variable resistance element 10, respectively.

In the floating gate transistor 80, the resistance value between the drain electrode 86 and the source electrode 87 changes by application of a voltage pulse to the control gate electrode 88. The extent to which the resistance value changes depends on the magnitude of the voltage pulse applied to the control gate electrode 88, and therefore the floating gate transistor 80 may be treated as the above variable resistance element 10.

(Evaluation of Synapse Circuit Using Floating Gate Transistor)

Figure 16:
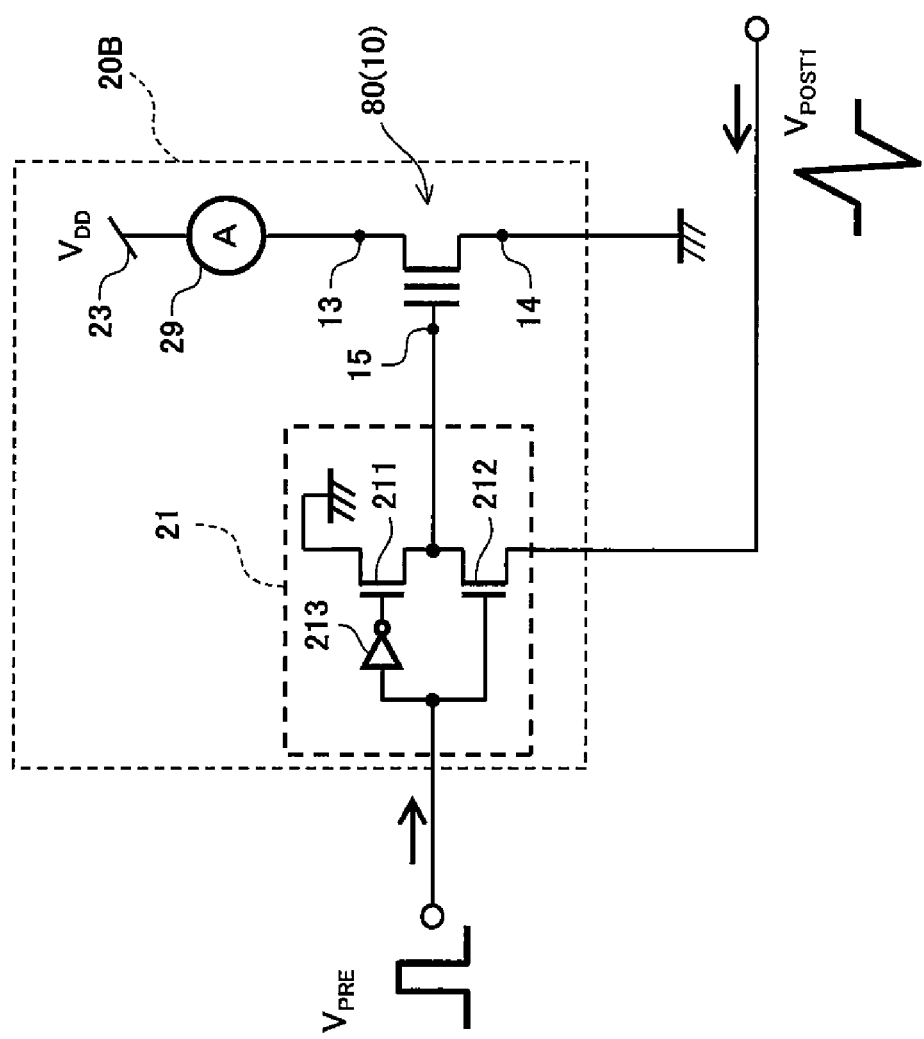
FIG. 16 is a block diagram showing the exemplary configuration of a verification synapse circuit incorporating the floating gate transistor.

It is verified whether or not the switching operation is realized, in a verification synapse circuit including the floating gate transistor 80. The result is as follows. FIG. 16 is a block diagram showing the exemplary configuration of a verification synapse circuit 20B incorporating the floating gate transistor 80. The verification synapse circuit 20B of FIG. 16 is the same as the verification synapse circuit 20A of FIG. 10 except that the ferroelectric memristor 70 used as the variable resistance element 10 is replaced by the floating gate transistor 80 (in FIG. 16, floating gate transistor 80 is indicated by the circuit symbol of FIG. 15B).

Figure 17A:
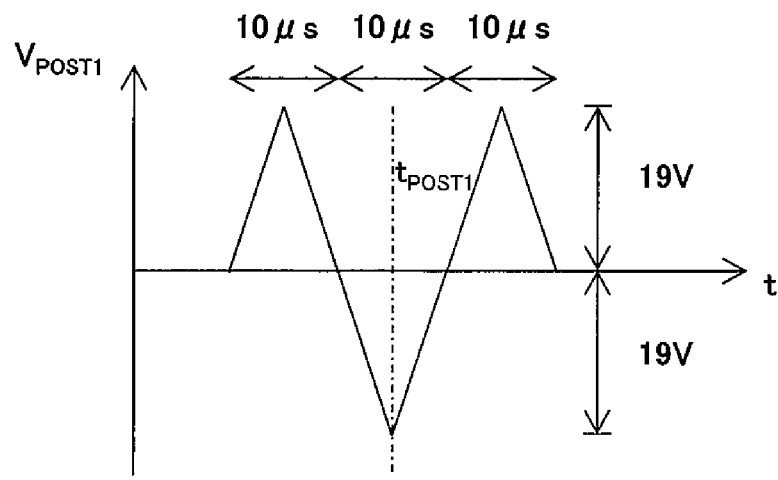
FIG. 17A is a graph showing the waveform of an analog pulse voltage input to the verification synapse circuit of FIG. 16.
Figure 17B:
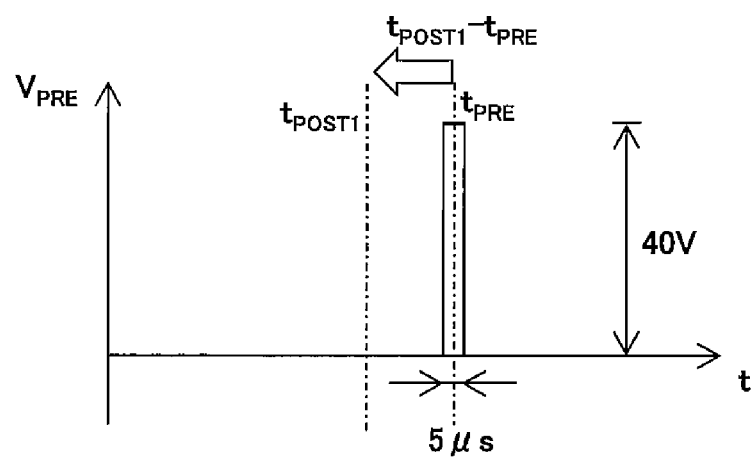
FIG. 17B is a graph showing the waveform of a switching pulse voltage input to the verification synapse circuit of FIG. 16.

FIG. 17A is a graph showing the waveform of the analog pulse voltage $V_{POST1}$ input to the verification synapse circuit 20B of FIG. 16. FIG. 17B is a graph showing the waveform of the switching pulse voltage $V_{PRE}$ input to the verification synapse circuit 20B of FIG. 16. The analog pulse voltage $V_{POST1}$ used in the present verification has a waveform formed by inverting the polarity of the mexican-hat pulse voltage of FIG. 3B. The cycle of the analog pulse voltage $V_{POST1}$, used in the present verification, is 300 μs (period from a certain time point of voltage 0 to a next time point of voltage 0 is 100 μs), and the maximum value of a magnitude of a positive voltage and the maximum value of a magnitude of a negative voltage are each 19V. The duration of the switching pulse voltage $V_{PRE}$, used in the present verification, is 5 μs, and the maximum value of a magnitude of a positive voltage and the maximum value of a magnitude of a negative voltage are each 20V. While changing the timing of the application of the analog pulse voltage $V_{POST1}$, and the timing of the application of the switching pulse voltage $V_{PRE}$, the conductance (current value measured by the current meter 29) before and after application of the pulse voltages is measured.

Figure 18:
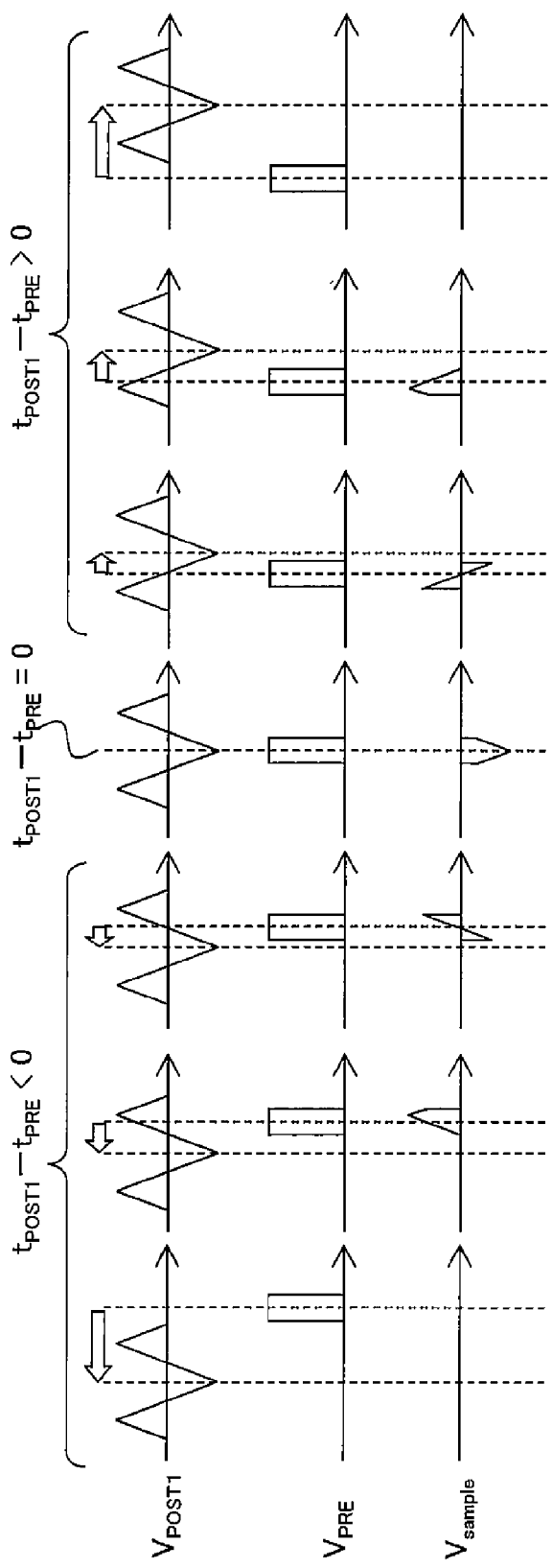
FIG. 18 is a timing chart of pulse voltages in a case where the analog pulse voltage of FIG. 17A is used as the analog pulse voltage, and the square wave pulse voltage of FIG. 17B is used as the switching pulse voltage.
Figure 19:
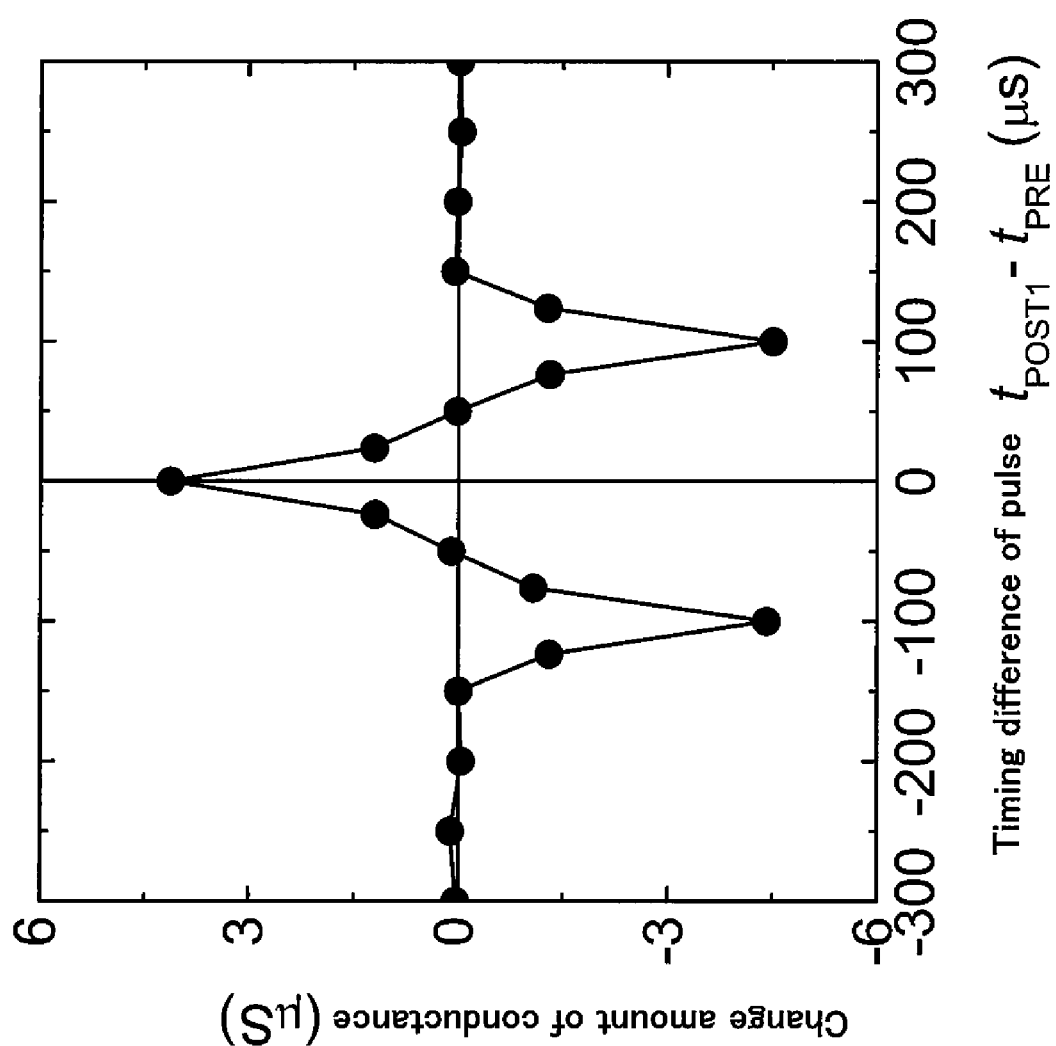
FIG. 19 is a graph showing the result of verification of the verification synapse circuit of FIG. 16.

FIG. 18 is a timing chart of pulse voltages in a case where the analog pulse voltage of FIG. 17A is used as the analog pulse voltage $V_{POST1}$, and the square wave pulse voltage of FIG. 17B is used as the switching pulse voltage $V_{PRE}$. FIG. 19 is a graph showing the result of verification of the verification synapse circuit 20B of FIG. 16. FIG. 19 shows the change amount of the conductance of the floating gate transistor 80 with respect to a time difference between the two pulses obtained from the verification synapse circuit 20B of FIG. 16. As shown in FIG. 19, the conductance changes depending on the time difference between the two pulses. Therefore, by using the floating gate transistor 80 as the variable resistance element 10, the learning operation based on the STDP can be implemented appropriately based on the timing difference between the pulses.

The present disclosure is useful in properly performing a learning operation using pulse timings even when neurons are large in number, in a neural network circuit and a learning method thereof.

Numeral improvements and alternative embodiments of the present disclosure will be conceived by those skilled in the art in view of the foregoing description. Accordingly, the description is to be construed as illustrative only, and is provided for the purpose of teaching those skilled in the art the best mode of carrying out the disclosure. The details of the structure and/or function may be varied substantially without departing from the spirit of the disclosure.

What is claimed is:

1. A neural network circuit including a plurality of neural network circuit elements which are interconnected, wherein each of the plurality of neural network circuit elements includes:
at least one synapse circuit which receives as an input a first input signal output from another neural network circuit element; and
one neuron circuit which receives as an input a signal output from the at least one synapse circuit;
wherein the synapse circuit includes a variable resistance element;
wherein the variable resistance element includes a first terminal, a second terminal, and a third terminal;
wherein a resistance value between the first terminal and the second terminal changes in response to an electric potential difference between the first terminal and the third terminal;
wherein the neuron circuit includes a waveform generating circuit for generating an analog pulse voltage having a specified waveform, which is output to the synapse circuit of the neural network circuit element including the neuron circuit, and a switching pulse voltage which has a waveform with a specified duration and is input as the first input signal to the synapse circuit of the another neural network circuit element;
wherein the synapse circuit is configured such that the analog pulse voltage generated in the neuron circuit of the neural network circuit element including the synapse circuit is input to the third terminal of the variable resistance element of the synapse circuit, for a permissible input period with the specified duration, as the first input signal from the another neural network circuit element; and
wherein the synapse circuit is configured such that the resistance value of the variable resistance element is changed in response to an electric potential difference between the first terminal and the third terminal, which occurs depending on a magnitude of the analog pulse voltage for the permissible input period.

2. The neural network circuit according to claim 1, wherein the plurality of neural network circuit elements are mounted on a plurality of chips; and
wherein the plurality of chips are configured such that an output terminal of at least one neural network circuit element mounted on one chip is connected to an input terminal of at least one neural network circuit element mounted on another chip.

3. The neural network circuit according to claim 1, wherein the synapse circuit includes a first switch which performs switching of connection or disconnection between the third terminal of the variable resistance element and a terminal of the neuron circuit from which the analog pulse voltage is output; and
wherein the first switch performs the switching of the connection or the disconnection in response to the first input signal from the another neural network circuit element.

4. The neural network circuit according to claim 1, wherein the variable resistance element is a ferroelectric gate transistor.

5. The neural network circuit according to claim 4, wherein the ferroelectric gate transistor includes a control electrode provided on a substrate; a ferroelectric layer provided such that the control electrode is in contact with the ferroelectric layer, a semiconductor layer provided on the ferroelectric layer, and a first electrode and a second electrode which are provided on the semiconductor layer; and wherein the ferroelectric gate transistor is configured such that a resistance value between the first electrode and the second electrode changes in response to an electric potential difference between the first electrode and the control electrode.

6. The neural network circuit according to claim 1,
wherein the neuron circuit includes:
an integrating circuit which integrates a value of a current flowing through the variable resistance element of the synapse circuit; and
the waveform generating circuit which generates a specified pulse voltage corresponding to the value of the current which is integrated by the integrating circuit.

7. The neural network circuit according to claim 1,
wherein the synapse circuit includes a second switch, one end of which is connected to a first reference voltage source and the other end of which is connected to the first terminal of the variable resistance element; and
wherein the second switch is configured to connect the first reference voltage source to the first terminal for a period during which the switching pulse voltage input from the another neural network circuit element is input to the second switch.

8. A method of learning in a neural network circuit including a plurality of neural network circuit elements which are interconnected,
wherein each of the plurality of neural network circuit elements includes:
at least one synapse circuit which receives as an input a first input signal output from another neural network circuit element; and
one neuron circuit which receives as an input a signal output from the at least one synapse circuit;
wherein the synapse circuit includes a variable resistance element;
wherein the variable resistance element includes a first terminal, a second terminal, and a third terminal;
wherein a resistance value between the first terminal and the second terminal changes in response to an electric potential difference between the first terminal and the third terminal;
wherein the neuron circuit includes a waveform generating circuit for generating an analog pulse voltage having a specified waveform, which is output to the synapse circuit of the neural network circuit element including the neuron circuit, and a switching pulse voltage which has a waveform with a specified duration and is input as the first input signal to the synapse circuit of the another neural network circuit element;
wherein the synapse circuit is configured such that the analog pulse voltage generated in the neuron circuit of the neural network circuit element including the synapse circuit is input to the third terminal of the variable resistance element of the synapse circuit, for a permissible input period with the specified duration, as the first input signal from the another neural network circuit element; and
wherein the synapse circuit is configured such that the resistance value of the variable resistance element is changed in response to an electric potential difference between the first terminal and the third terminal, which occurs depending on a magnitude of the analog pulse voltage for the permissible input period.

* * * * *